(12) United States Patent
Mohamed

(10) Patent No.: US 11,002,377 B2
(45) Date of Patent: May 11, 2021

(54) SYSTEMS AND METHODS FOR A REED VALVE MODULE AND A MODULAR REED VALVE ASSEMBLY

(71) Applicant: Zahroof Valves Inc., Houston, TX (US)

(72) Inventor: Zahroof Mohamed, Cypress, TX (US)

(73) Assignee: Zahroof Valves Inc., Houston, TX (US)

( * ) Notice: Subject to any disclaimer, the term of this patent is extended or adjusted under 35 U.S.C. 154(b) by 0 days.

(21) Appl. No.: 15/974,425

(22) Filed: May 8, 2018

(65) Prior Publication Data

US 2018/0252325 A1 Sep. 6, 2018

Related U.S. Application Data

(63) Continuation-in-part of application No. 13/510,245, filed as application No. PCT/US2010/057193 on Nov. 18, 2010, now Pat. No. 9,989,161.
(Continued)

(51) Int. Cl.
*F16K 15/14* (2006.01)
*F16K 15/16* (2006.01)
(Continued)

(52) U.S. Cl.
CPC .............. *F16K 15/16* (2013.01); *F01L 3/205* (2013.01); *F04B 39/1066* (2013.01);
(Continued)

(58) Field of Classification Search
CPC ...... F16K 15/144; F16K 15/145; F16K 15/16; F16K 15/202; F01L 3/205; F04B 39/1073;
(Continued)

(56) References Cited

U.S. PATENT DOCUMENTS

| 1,022,157 A | 4/1912 | Scott |
| 1,599,414 A | 9/1926 | Huff |

(Continued)

FOREIGN PATENT DOCUMENTS

| CH | 255795 A | 7/1948 |
| CN | 85201501 U | 1/1986 |

(Continued)

OTHER PUBLICATIONS

Examination Report from Indian Patent Application No. 5195/DELNP/2012 dated Sep. 13, 2018.
(Continued)

*Primary Examiner* — Hailey K. Do
(74) *Attorney, Agent, or Firm* — Jonathan Pierce; Pierre Campanac; Porter Hedges LLP

(57) ABSTRACT

A reed valve module includes a module body and a reed petal. The module body includes a seating surface located on a first side of the module body and a sealing face located on a second side the module body. The reed petal is positioned adjacent to the second side of the module body and adapted to seal against the sealing face when the reed petal is in a closed position, wherein the reed valve module is a self-contained modular unit that is adapted to be inserted into a receiving cavity of a modular reed valve assembly such that the seating surface is positioned adjacent to a retaining surface of the modular reed valve assembly and an interfacing surface of the reed valve module is positioned adjacent to a second retaining surface of the modular reed valve assembly, and wherein the reed valve module is adapted to be captured and retained within the modular reed valve assembly between the first and second retaining surfaces.

58 Claims, 9 Drawing Sheets

Related U.S. Application Data

(60) Provisional application No. 61/262,248, filed on Nov. 18, 2009.

(51) Int. Cl.
*F16K 15/20* (2006.01)
*F01L 3/20* (2006.01)
*F04B 39/10* (2006.01)
*F04B 53/10* (2006.01)

(52) U.S. Cl.
CPC ........ *F04B 39/1073* (2013.01); *F04B 53/104* (2013.01); *F16K 15/144* (2013.01); *F16K 15/202* (2013.01); *Y10T 137/0491* (2015.04); *Y10T 137/784* (2015.04); *Y10T 137/7839* (2015.04); *Y10T 137/7843* (2015.04); *Y10T 137/7891* (2015.04); *Y10T 137/7892* (2015.04)

(58) Field of Classification Search
CPC .. F04B 53/104; F04B 53/1047; F04B 53/105; F04B 53/1052; F04B 53/1055; Y10T 137/7839; Y10T 137/784; Y10T 137/7843; Y10T 137/7891; Y10T 137/7892
See application file for complete search history.

(56) References Cited

U.S. PATENT DOCUMENTS

| | | | |
|---|---|---|---|
| 1,632,155 A | 6/1927 | Vollmann | |
| 1,754,747 A | 4/1930 | Feldbush | |
| 1,799,103 A | 3/1931 | Klimek | |
| 2,199,307 A | 4/1940 | Eichelberg | |
| 2,408,056 A | 9/1946 | Farmer | |
| 2,505,757 A | 5/1950 | Dunbar et al. | |
| 2,781,777 A | 2/1957 | Oxnam | |
| 2,934,083 A | 4/1960 | Norton | |
| 3,286,728 A | 11/1966 | Stephenson | |
| 3,395,858 A | 8/1968 | Spencer et al. | |
| 3,412,754 A | 11/1968 | Schou et al. | |
| 3,438,390 A * | 4/1969 | Brown ................ | F04B 39/1066 137/512.1 |
| 3,556,136 A | 1/1971 | White | |
| 3,703,912 A | 11/1972 | Bauer et al. | |
| 3,905,340 A | 9/1975 | Boyesen | |
| 3,905,341 A | 9/1975 | Boyesen | |
| 4,036,251 A | 7/1977 | Hartwick et al. | |
| 4,051,820 A | 10/1977 | Boyesen | |
| 4,058,138 A | 11/1977 | Viktorov et al. | |
| 4,168,722 A | 9/1979 | Mayer et al. | |
| 4,172,696 A | 10/1979 | Gyory | |
| 4,173,985 A | 11/1979 | Kirpichenkov | |
| 4,195,660 A | 4/1980 | Taipale et al. | |
| 4,290,455 A | 9/1981 | Honda et al. | |
| 4,294,202 A | 10/1981 | Boyesen | |
| 4,483,363 A | 11/1984 | Madoche et al. | |
| 4,633,825 A | 1/1987 | Flaig | |
| 4,643,139 A | 2/1987 | Hargreaves | |
| 4,819,689 A | 4/1989 | Owsley et al. | |
| 4,854,341 A | 8/1989 | Bauer | |
| 4,872,481 A | 10/1989 | Shaw et al. | |
| 4,879,976 A | 11/1989 | Boyesen | |
| 4,924,906 A | 5/1990 | Hrabal | |
| 4,934,362 A | 6/1990 | Braun | |
| 5,027,754 A | 7/1991 | Morone | |
| 5,103,867 A | 4/1992 | Wu | |
| 5,245,956 A | 9/1993 | Martin | |
| 5,364,244 A | 11/1994 | Taylor-McCune et al. | |
| 5,390,699 A | 2/1995 | Yamada | |
| 5,454,397 A | 10/1995 | Miszczak | |
| 5,672,053 A | 9/1997 | Sabha | |
| 6,394,128 B1 | 5/2002 | Concialdi | |
| 7,028,649 B1 | 4/2006 | Hosaluk et al. | |
| 7,614,422 B2 | 11/2009 | Tassinari et al. | |
| 8,365,771 B2 | 2/2013 | Xue et al. | |
| 8,485,801 B2 | 7/2013 | Mohamed | |
| 2003/0019527 A1 | 1/2003 | Oppermann et al. | |
| 2007/0065321 A1 | 3/2007 | Durham | |
| 2008/0156381 A1 | 7/2008 | Tuymer | |
| 2008/0223459 A1 | 9/2008 | Walpole et al. | |
| 2010/0040497 A1 | 2/2010 | Mohamed | |
| 2010/0090149 A1 | 4/2010 | Thompson et al. | |
| 2010/0108163 A1 | 5/2010 | Mohamed | |
| 2011/0139158 A1 | 6/2011 | Xue et al. | |
| 2012/0227847 A1 | 9/2012 | Mohamed | |

FOREIGN PATENT DOCUMENTS

| | | |
|---|---|---|
| EP | 0426223 A1 | 5/1991 |
| GB | 496795 A | 12/1938 |
| GB | 583847 A | 1/1947 |
| GB | 2361290 A | 10/2001 |
| SU | 1002660 A1 | 3/1983 |
| WO | 2008091672 A1 | 7/2008 |

OTHER PUBLICATIONS

PCT International Search Report and Written Opinion, dated Jan. 19, 2011, Appl No. PCT/US/2010/057193, "Systems and Methods for a Reed Valve Module and Valve Assembly", filed Nov. 18, 2010, 10 pgs.
European Search Report and Search Opinion (EP 10 832 162.1), dated Apr. 15, 2013.
New Zealand First Examination (NZ 600534), dated Feb. 11, 2013.
Chinese First Examination Notification (CN 201080052302.3), dated Jul. 10, 2013.
New Zealand Examination Report (NZ 619638), dated Jan. 21, 2014.
New Zealand Examination Report (NZ 619640), dated Jan. 21, 2014.
Gulf Cooperation Council Examination Report (GC Appl. No. 17123), dated Nov. 24, 2013.
Office Action dated Dec. 12, 2014 from the Russian Patent Office for counterpart RU Application No. 2012125069, including translation and letter from foreign agent, 11 pages total.
New Zealand Intellectual Property Office Further Examination Report dated Jan. 17, 2014 for NZ Application No. 600534, 2 pages.
New Zealand Intellectual Property Office Further Examination Report dated Apr. 9, 2014 for NZ Application No. 600534, 2 pages.
New Zealand Intellectual Property Office Further Examination Report dated Apr. 24, 2014 for NZ Application No. 619638, 3 pages.
GCC Patent Office Examination Report dated Feb. 9, 2014 for GCC Application No. GC 2010-17123, 5 pages.
China State Intellectual Property Office Examination Report dated Jan. 17, 2014 for CN Application No. 201080052302.3, 4 pages.
Ukraine Patent Office Decision to Grant dated Jun. 27, 2014 for UA Application No. 201207333, 11 pages.
European Patent Office Examination Report dated Sep. 17, 2014 for EP Application No. 10832162.1, 5 pages.
Mexican Institute of Industrial Property Office Action dated Jul. 7, 2014 for MX Application No. MX/a/2012/005767, 5 pages.
Examination Report dated May 22, 2015 from the European Patent Office for counterpart EP Application No. 10832162.1, 4 pages.
Office Action dated Jun. 17, 2015 from the Taiwan Patent Office for counterpart TW Application No. 99139749, including translation, 17 pages total.
Office Action dated Mar. 13, 2015, for MX Application No. MX/a/2012/005767, from Mexican Institute of Industrial Property, 6 pages.
Decision of Grant dated Apr. 16, 2015, for RU Application No. 2012125069, from Russian Patent Office, 20 pages.
Australian Office Action dated Nov. 19, 2015 for AU Application No. 2010322003, filed on Nov. 18, 2010.
Mexican Office Action dated Oct. 16, 2015 for MX Application No. MX/a/2012/005767, filed on Nov. 18, 2010.
Official Action from Malaysian patent application No. PI 2012002150 dated Jun. 15, 2016.

(56) References Cited

OTHER PUBLICATIONS

Official Action from Philippines patent application No. 1/2012/501100 dated Aug. 25, 2016.
Translation of Official Action from Taiwan patent application No. 99139749 dated Apr. 18, 2016.
Mexican Office Action dated Jun. 13, 2016 for MX Application No. MX/a/2012/005767, filed on Nov. 18, 2010.
Communication of Opposition dated Jul. 10, 2017 from European patent application No. 10832162.1.
Canadian Official Action dated Apr. 11, 2017 from Canadian patent application No. 2,816,820.
Canadian Examination Report dated Dec. 12, 2017 from Canadian patent application No. 2,816,820.
GCC Examination Report dated Sep. 19, 2017 from GCC divisional patent application No. GC 2010-26401.

* cited by examiner

SYSTEMS AND METHODS FOR A REED VALVE MODULE AND A MODULAR REED VALVE ASSEMBLY

RELATED APPLICATIONS

This application is a continuation-in-part of U.S. patent application Ser. No. 13/510,245, filed May 16, 2012, which was a 371 filing of PCT Application PCT/US10/57193, filed Nov. 18, 2010, which claimed priority from U.S. Provisional Patent Application 61/262,248, filed Nov. 18, 2009, which are incorporated by reference in their entirety.

BACKGROUND

1. Field of the Disclosure

The present disclosure is generally directed to valve assemblies, and in particular to systems and methods for using novel reed valve modules in modular valve assemblies for various flow control systems, such as compression systems.

2. Description of the Related Art

As will be appreciated, fluids such as natural gas, hydrogen, process gases, refrigerants and air have a wide array of uses in industrial and commercial applications. For instance, natural gas may be used to provide power to a range of machines and vehicles, to heat homes during winter, and to operate various consumer appliances, such as ovens or clothes dryers. Furthermore, natural gas may be used to generate electricity for distribution over a power grid, and different process gases and air may be used in the manufacture of an array of products and materials, such as for example glass, steel, plastics, and the like.

To meet the increasing demand for natural gas, companies may spend a significant amount of time and resources searching for, extracting and transporting natural gas. Hydrogen may be produced centrally and distributed through pipelines, and in process plants different gases or liquids may be transported through passages for delivery to the point where the gases or liquids are used for a variety of purposes. In most large manufacturing facilities, air under pressure is made available at different points through a network of pipes, and as may also be appreciated, the transportation of such gases or liquids, such as through a pipeline from one point to another, is often facilitated by compression of the gas or liquid via a compressor or pump.

One common type of compressor for such applications is a reciprocating compressor, which is a positive-displacement device that generally utilizes a crankshaft that is coupled to pistons, via connecting rods and crossheads, to reciprocally drive the pistons and compress a fluid within attached compression cylinders. As may be appreciated by one skilled in the art, gas is generally introduced into compression chambers of the cylinders through one or more inlet or suction valve assemblies and, following compression, the fluid generally exits the cylinders via one or more outlet or discharge valve assemblies.

The type of valve assemblies commonly used in compressors includes poppet valves, plate valves, ring valves, channel valves, and reed valves. In the current art, poppet valve, plate valve, ring valve, and channel valve assemblies all typically include a single or a set of sealing elements disposed between a seat plate and a guard plate. Current reed valve assemblies used in compressor applications consist of a seat plate and a plurality of petals and guards/stoppers attached to the seat plate by a fastening means, such as screws.

As many compressors routinely operate at hundreds or even thousands of rotations per minute (rpm), the sealing elements also open and close at a similarly high rate. Due to this rapid cycling, the seat plate, the guard, and/or the sealing elements will often wear over time, leading to possibility of a valve failure if the wear is left unchecked. To avoid such failures, the valves are periodically removed from the compressor and refurbished as part of a preventive maintenance program. Furthermore, while such valve failures cannot always be avoided, the valves can typically be repaired and reused, especially the more expensive components such as the seat and guard. This is typically accomplished through replacement of the sealing elements, machining/refinishing or replacement of the seat and/or guard or the like. Of course, such maintenance is often time-consuming and/or costly.

In existing art, in the reed valve assembly, the petals and guards are attached to the seat/body/cage by individual fastening means. It is possible for these fastening means to loosen during operation, eventually coming off. Petals can fail in fatigue and pieces may break off. These loose pieces can fall into the cylinder, causing extensive damage to the compressor or engine piston/cylinder.

The cost of the power that is required to compress a gas is the major operational expense incurred by a company that operates compressors and/or gas distribution systems. The efficiency of the compressor determines the amount of power that is required to operate it, and higher efficiency compressors typically provide the lowest overall operating costs. Valve losses are a major source of efficiency reduction in compressors and can contribute anywhere from 5% to more than 20% of the overall operating power. In the existing reed valve, poppet valve, plate valve, ring valve, and channel valve assemblies that are used in gas compression processes, the gas must typically make at least two right-angle turns to get by the sealing element while passing through the valve. Furthermore, the greater the turning angle the greater the resistance to flow through the compressor, which consequently has a direct adverse effect on compressor efficiency.

The amount of time that is required to successfully service a valve directly impacts the amount of time that a given machine is down, and in turn directly impacts the overall costs for machine down-time. For existing valves installed in the field, it can be very difficult to check the quality of the assembled valve, as this depends on the tolerance of all the parts and how the valve is assembled. An otherwise minor problem in a seat or guard can therefore lead to sealing elements that do not seal properly, which is a problem that can only be detected after the entire valve has been assembled and installed.

The present disclosure is generally directed to new and useful valve assemblies, such as modular valve assemblies made up of one or more reed valve modules, that are intended to at least mitigate, or even eliminate, one or more the above-noted problems associated with prior art valve assemblies.

SUMMARY OF THE DISCLOSURE

The following presents a simplified summary of the disclosure in order to provide a basic understanding of some aspects of the subject matter that is described in further detail below. This summary is not an exhaustive overview of the disclosure, nor is it intended to identify key or critical elements of the subject matter disclosed here. Its sole purpose is to present some concepts in a simplified form as a prelude to the more detailed description that is discussed later.

The present disclosure is generally directed to valve assemblies, and in particular to systems and methods for using novel reed valve modules in modular valve assemblies for various flow control systems. In one illustrative embodiment, a reed valve module is disclosed that includes, among other things, a module body and a reed petal, wherein the module body includes a seating surface located on a first side of the module body and a sealing face located on a second side the module body. Additionally, the reed petal is positioned adjacent to the second side of the module body and adapted to seal against the sealing face when the reed petal is in a closed position, wherein the reed valve module is a self-contained modular unit that is adapted to be inserted into a receiving cavity of a modular reed valve assembly such that the seating surface is positioned adjacent to a retaining surface of the modular reed valve assembly and an interfacing surface of the reed valve module is positioned adjacent to a second retaining surface of the modular reed valve assembly, and wherein the reed valve module is adapted to be captured and retained within the modular reed valve assembly between the first and second retaining surfaces.

In another exemplary embodiment of the present disclosure, a modular reed valve assembly includes, among other things, a structure having a receiving cavity and a reed valve module positioned in the receiving cavity, wherein the reed valve module includes a seating surface that is positioned adjacent to a first retaining surface of the modular reed valve assembly and an interfacing surface that is positioned adjacent to a second retaining surface of the modular reed valve assembly, wherein the reed valve module is captured and retained within the modular reed valve assembly between the first and second retaining surfaces.

Also disclosed herein is another illustrative modular reed valve assembly that includes, among other things, a structure having a receiving cavity, a first reed valve module positioned in the receiving cavity, and a second reed valve module positioned in the receiving cavity. Additionally, the first reed valve module includes a first seating surface that is positioned adjacent to a first retaining surface of the modular reed valve assembly and a first interfacing surface that is positioned adjacent to a second retaining surface of the modular reed valve assembly, wherein the first reed valve module is captured and retained within the modular reed valve assembly between the first and second retaining surfaces. Furthermore, the second reed valve module includes a second seating surface that is positioned adjacent to a third retaining surface of the modular reed valve assembly and a second interfacing surface that is positioned adjacent to a fourth retaining surface of the modular reed valve assembly, wherein the second reed valve module is captured and retained within the modular reed valve assembly between the third and fourth retaining surfaces.

In a further exemplary embodiment disclosed herein, a method of assembling a modular reed valve assembly includes providing a first structure having a receiving cavity and first and second fluid inlet ports, wherein the receiving cavity is in fluid communication with the first and second fluid inlet ports. Additionally, the illustrative method further includes inserting a first reed valve module into the receiving cavity so that a first seating surface of the first reed valve module is positioned adjacent to a first retaining surface of the modular reed valve assembly, and, after inserting the first reed valve module into the receiving cavity, inserting a second reed valve module into the receiving cavity so that a second seating surface of the second reed valve module is positioned adjacent to a second retaining surface of the modular reed valve assembly.

BRIEF DESCRIPTION OF THE DRAWINGS

The disclosure may be understood by reference to the following description taken in conjunction with the accompanying drawings, in which like reference numerals identify like elements, and in which.

Figure 1:
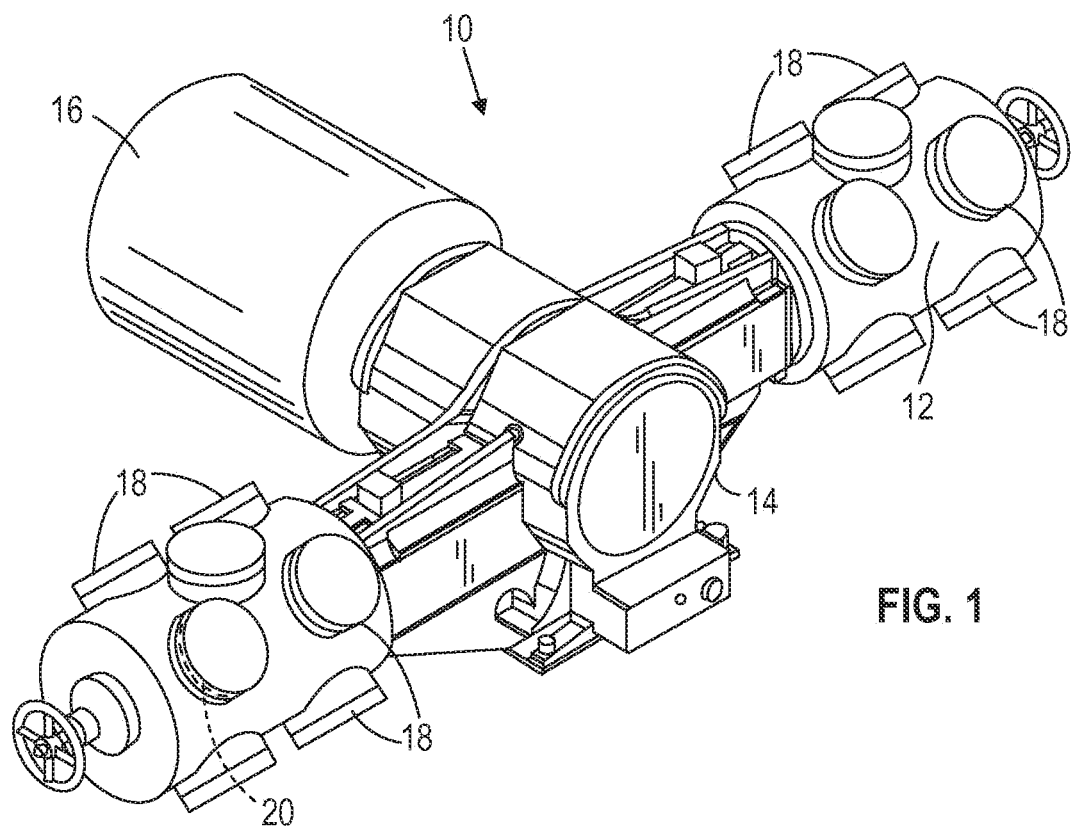
FIG. 1 is a perspective view of a reciprocating compressor that includes an exemplary modular reed valve assembly in accordance with one embodiment disclosed herein.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the subject matter defined by the appended claims to the particular forms disclosed, but on the contrary, the intention is to cover all modifications, equivalents, and alternatives falling within the spirit and scope of the claimed subject matter.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e. a definition that is different from the ordinary and customary meaning as understood by those skilled in the art, is intended to be implied by consistent usage of the term or phrase herein. To the extent that a term or phrase is intended to have a special meaning, i.e. a meaning other than that understood by skilled artisans, such a special definition will be expressly set forth in the specification in a definitional manner that directly and unequivocally provides the special definition for the term or phrase.

As used in this description and in the appended claims, the terms "substantial" or "substantially" are intended to conform to the ordinary dictionary definition of that term, meaning "largely but not wholly that which is specified." As such, no geometrical or mathematical precision is intended by the use of terms such as "substantially flat," "substantially perpendicular," "substantially parallel," "substantially circular," "substantially elliptical," "substantially rectangular," "substantially square," "substantially aligned," and/or "substantially flush," and the like. Instead, the terms "substantial" or "substantially" are used in the sense that the described or claimed component or surface configuration, position, or orientation is intended to be manufactured, positioned, or oriented in such a configuration as a target. For example, the terms "substantial" or "substantially" should be interpreted to include components and surfaces that are manufactured, positioned, or oriented as close as is reasonably and customarily practicable within normally accepted tolerances for components of the type that are described and/or claimed. Furthermore, the use of phrases such as "substantially conform" or "substantially conforms" when describing the configuration or shape of a particular component or surface, such as by stating that "the configuration of the component substantially conforms to the configuration of a cube" should be interpreted in similar fashion.

Figure 3:
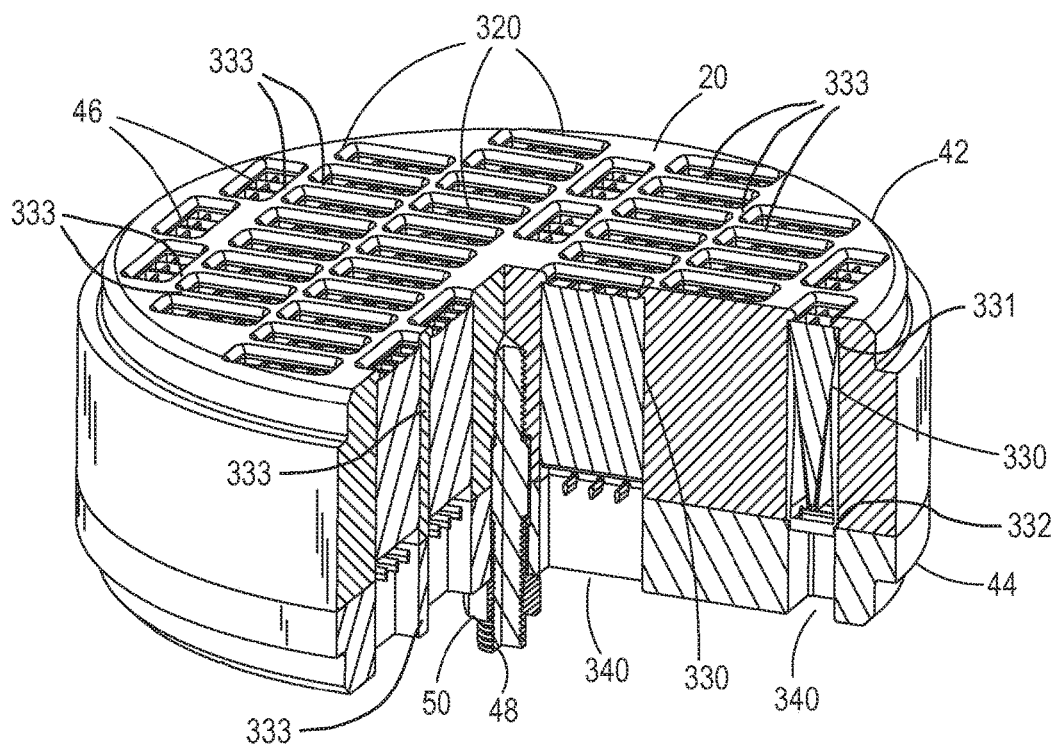
FIG. 3 is a partial cross-sectional perspective view of an exemplary modular reed valve assembly in accordance with certain illustrative embodiments of the present disclosure.
Figure 10:
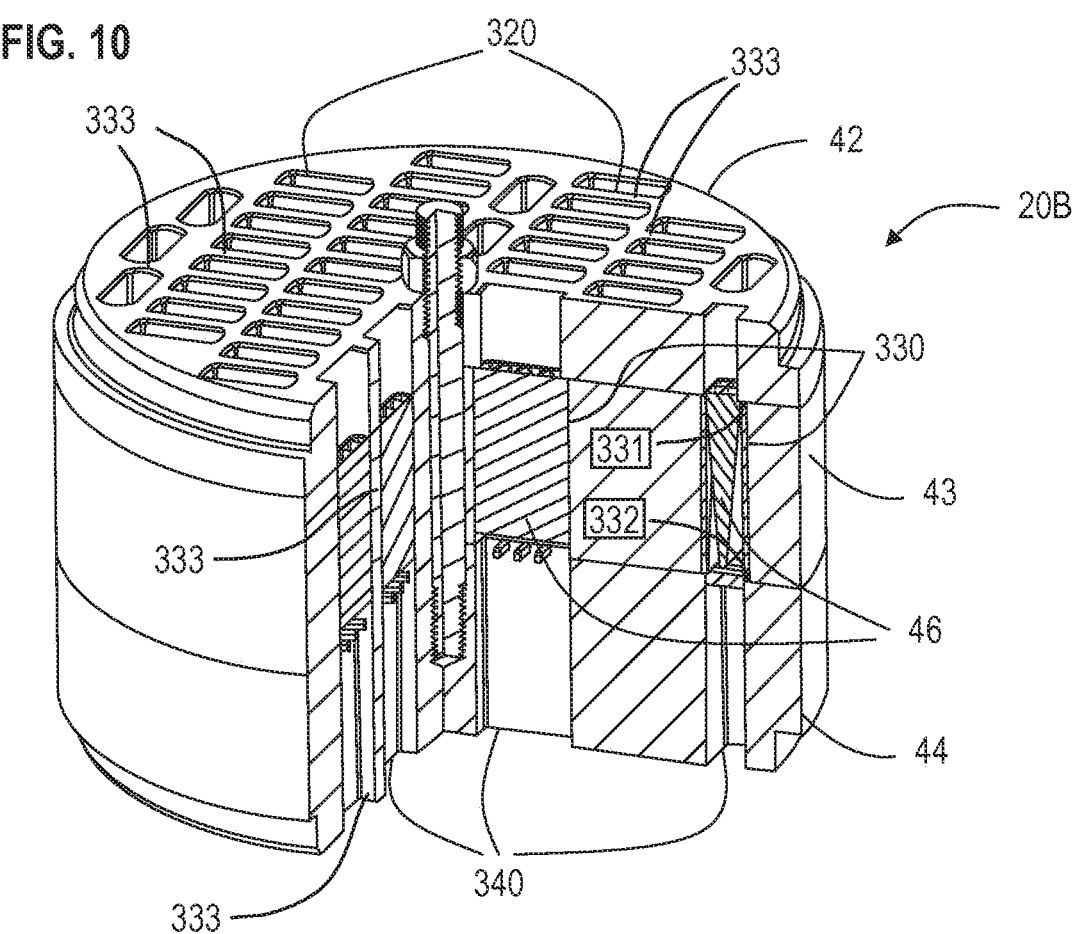
FIG. 10 is a partial cross-sectional perspective view of another exemplary modular reed valve assembly according to some illustrative embodiments.

Furthermore, it should be understood that, unless otherwise specifically indicated, any relative positional and/or directional terms that may be used in the descriptions set forth below—such as "upper," "lower," "above," "below," "over," "under," "top," "bottom," "vertical," "horizontal," "lateral," and the like—have been included for convenience so as to provide additional clarity to the description, and should be construed in light of that term's normal and everyday meaning relative to the depiction of the components or elements in the referenced figures. For example, referring to the reed valve module 46 shown in FIGS. 6-8, it should be understood that the seating surface 640 is depicted as being located at the "top" or "upper" end of the module body 610, whereas the trap members 770 are depicted as being located at the "bottom" or "lower" end of the reed valve module 46. Additionally, the seat plate 42 of the modular reed valve assembly 20B depicted in FIG. 10 is shown as being positioned "above" the receiving cavity plate 43 and "above" the retainer plate 44, the retainer plate 44 of the modular reed valve assembly 20 shown in FIG. 3 is shown as being "below" the seat plate 42. However, it should be understood by the ordinarily skilled artisan that the various components that are described herein using such relative positional terms need not be oriented as shown in the attached figures during operation of the disclosed embodiments, but instead may be oriented in substantially any manner unless otherwise specifically indicated in the descriptions below.

Turning now to the figures, an exemplary compressor 10 is shown in FIG. 1. In the depicted embodiment, the compressor 10 includes a pair of compression cylinders 12 that are coupled to a frame 14. As discussed in greater detail below, a variety of internal components may be disposed within the cylinders 12 and the frame 14 to enable compression of fluids within the cylinders 12. In some embodiments, the compressor 10 may be utilized to compress natural gas, however it should be understood the compressor 10 is not so limited, as in other embodiments it may be configured and/or utilized to compress fluids other than natural gas. A mechanical power source or driver 16, such as an engine or an electric motor, may be coupled to the compressor 10 so as to provide mechanical power to the various internal components, and to enable compression of the working fluid within the cylinders 12. To facilitate access to such internal components, as may be required for diagnostic or maintenance purposes, openings (not shown) in the frame 14 may be provided and selectively accessed via removable covers (not shown) disposed over the openings.

In certain embodiments, the exemplary cylinders 12 may include capped recesses 18 that are each configured to receive a valve assembly, such as the modular reed valve assembly 20 in accordance with the various embodiments disclosed herein. Furthermore, while only a single modular reed valve assembly 20 is specifically illustrated in FIG. 1, it should be understood that in various embodiments disclosed herein, additional modular reed valve assemblies 20 may be included within some or all of the other capped recesses 18. It should also be understood that the cylinders 12 may include internal fluid conduits between the recesses 18 and the modular reed valve assemblies 20 that facilitate the flow of a fluid into and out of the cylinders 12 through the modular reed valve assemblies 20. Additionally, various installation components, such as cages or fasteners (not shown) may also be employed to facilitate mounting of the modular reed valve assemblies 20 within the recesses 18.

Figure 2:
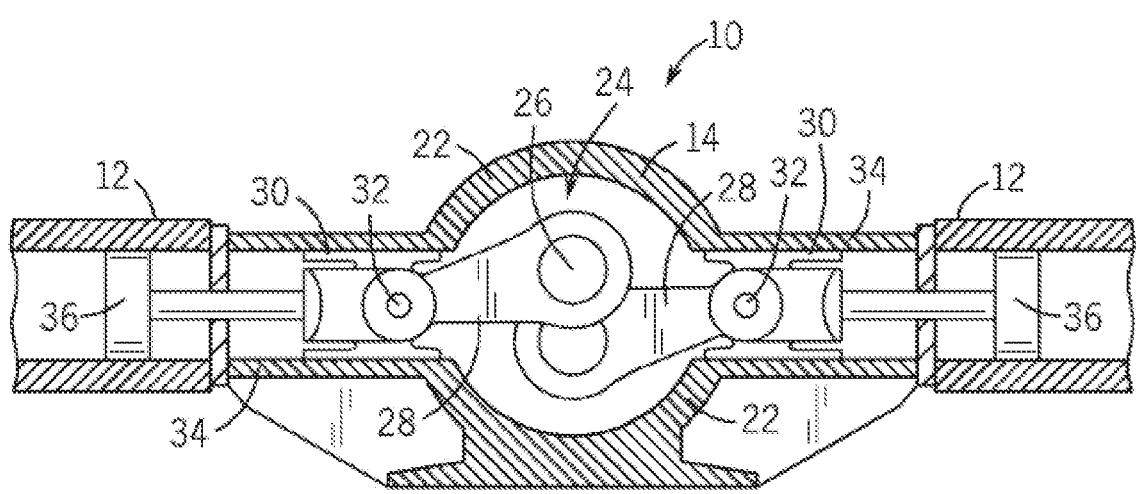
FIG. 2 is an axial cross-sectional view of the exemplary compressor of FIG. 1, illustrating internal components of the compressor in accordance with one embodiment of the present disclosure.

Although the exemplary compressor 10 depicted in FIGS. 1 and 2 is illustrated as a two-throw reciprocating compressor, it should be understood by those of ordinary skill after a complete reading of the present subject matter that other compressor configurations may also employ and benefit from the assemblies and techniques disclosed herein. For example, in at least some embodiments, the compressor 10 may include a different number of cylinder throws, such as a four-throw compressor, a six-throw compressor, a couple-free reciprocating compressor, or the like. Furthermore, other variations of the overall machine design may also be used, including variations in the length of stroke and/or the operating speed and the size, to name but a few. Additionally, the machine in which the valve is employed may be of a design other than a reciprocating compressor, such as a screw compressor, a scroll compressor, a refrigeration compressor, a centrifugal compressor, a chiller, a process flow system, and the like.

A cross-sectional view of the exemplary compressor 10 is provided in FIG. 2, which illustrates a number of typical internal components of the compressor shown in FIG. 1. For example, the frame 14 of the compressor 10 may include a hollow central body or housing 22 that generally defines an interior volume 24 wherein various internal components may be positioned, such as a crankshaft 26 and connecting rods 28. In some embodiments, the central body 22 may have a generally curved or cylindrical shape, however other shapes or configurations of the central body 22 may also be used in accordance with the present disclosure.

In operation, the driver 16 rotates the crankshaft 26 supported within the interior volume 24 of the frame 14. In certain embodiments, the crankshaft 26 is coupled to crossheads 30 via the connecting rods 28 and pins 32. The crossheads 30 are disposed within crosshead guides 34, which generally extend from the central body 22 and facilitate connection of the cylinders 12 to the compressor 10. In one embodiment, the compressor 10 includes two crosshead guides 34 that extend generally perpendicularly from opposite sides of the central body 22, although other configurations are also envisaged. As may be appreciated, the rotational motion of the crankshaft 26 is translated via the connecting rods 28 to reciprocal linear motion of the crossheads 30 within the crosshead guides 34.

As noted above, the cylinders 12 are configured to receive a fluid for compression. The crossheads 30 are coupled to pistons 36 disposed within the cylinders 12, and the reciprocating motion of the crossheads allows compression of fluid within the cylinders 12 via the pistons 36. For example, as a piston 36 is driven forward (i.e. outwardly from central body 22) into a cylinder 12, the piston 36 forces fluid within the cylinder into a smaller volume, thereby increasing the pressure of the fluid. A discharge valve, such as modular valve assembly 20, may then open to allow the pressurized or compressed fluid to exit the cylinder 12. The piston 36 may then stroke backward, and additional fluid may enter the cylinder 12 through an inlet valve, which may also include a modular valve assembly 20, for compression in the same manner described above. Additionally, it should be appreciated that the cylinders 12 may be configured to compress the fluid on both the forward and the backward strokes of the piston 36. For example, as the piston 36 moves forward in the manner discussed above to compress fluid on one side of the piston, additional fluid may be introduced into the cylinder on the opposite side of the piston, which in turn would then be compressed on the backward stroke of the piston 36.

Figure 4:
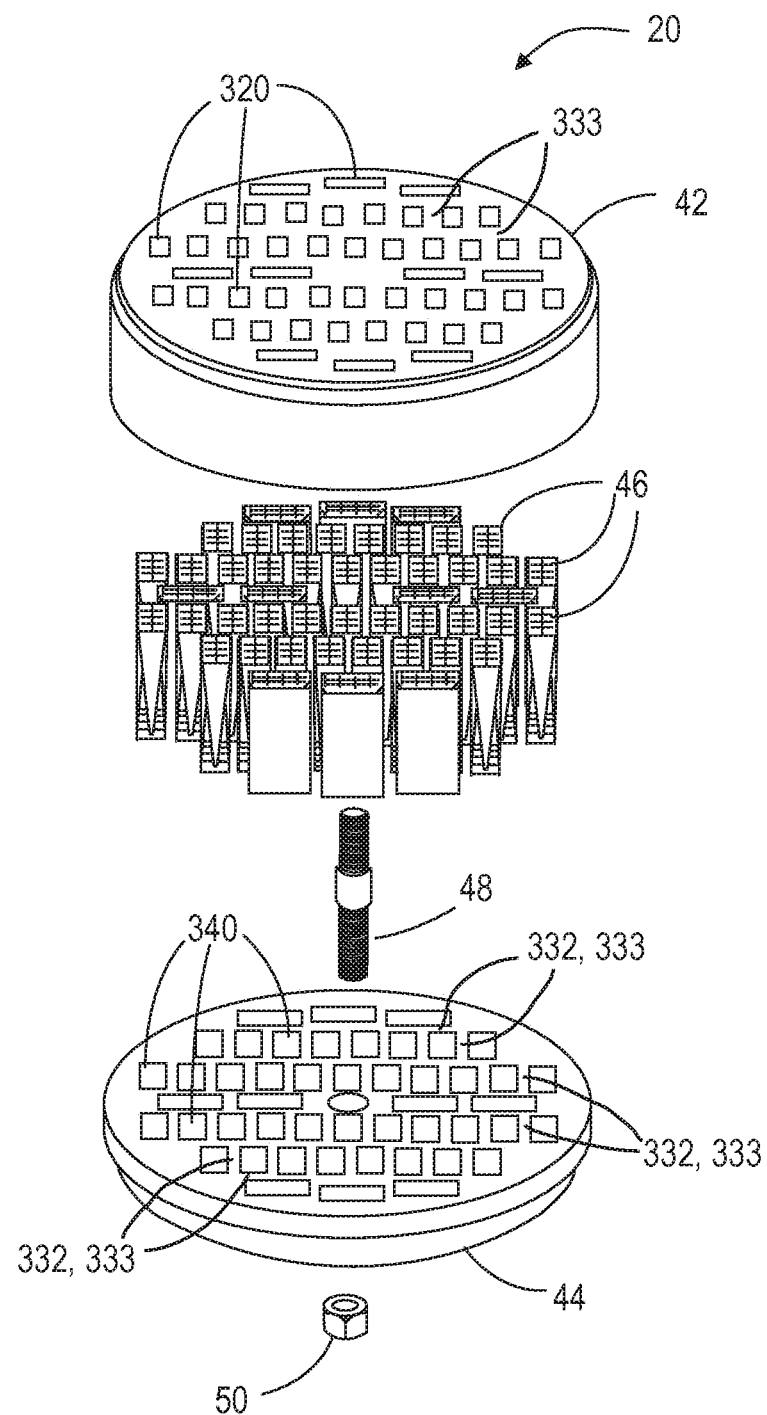
FIG. 4 is an exploded view of the exemplary modular reed valve assembly of FIG. 3 illustrating certain components of the modular reed valve assembly according to some embodiments disclosed herein.

Illustrative modular valve assemblies 20 in accordance with certain aspects of the present disclosure are depicted in FIGS. 3-5, FIGS. 10-12, and FIG. 15. Generally, these exemplary embodiments are representative of various modular valve assemblies 20 that are configured as discharge valves, although it should be noted that FIG. 10 in particular is configured to be representative of a suction/inlet valve. As shown in FIGS. 3 and 4, the modular valve assembly 20 may include a seat plate 42 and a retainer plate 44. Typically, the seat plate 42 is configured as a structural component of the modular valve assembly 20 that is adapted to withstand the cyclical pressure differential across the valve assembly 20 during operation. Furthermore, the retainer plate 44 is typically adapted to work in conjunction with the seat plate 42 so as to retain one or more valve modules (such as the reed valve modules 46 described herein) within the valve assembly 20, as is set forth in further detail below. The seat plate 42 and the retainer plate 44 may be coupled to one another by use of one or more fasteners, such as, for example, a stud 48 and mating nut 50 as shown in FIGS. 3 and 4, although it should be understood that other suitable fastening means may also be used. Furthermore, while the modular valve assembly 20 shown in FIGS. 3 and 4 depicts the stud 48 and nut 50 as being substantially centrally located within the assembled seat and retainer plates 42/44, it should be appreciated that in other embodiments, fasteners (such as screws and/or stud and nuts) may be employed toward the periphery of the valve seat (for example, at the inlet side of the valve in the case of a suction valve) or the valve retainer (for example, at the outlet side of the valve in the case of a discharge valve). Furthermore, the fasteners may be positioned along the periphery of the valve such that the fasteners are captured by a cage that is used to locate the modular valve assemblies 20 within the recesses 18 of the compressor 10.

With continuing reference to the illustrative embodiment shown in FIGS. 3 and 4, the seat plate 42 may have a plurality of fluid inlet passageways or ports 320, and the retainer plate 44 may have a corresponding number of fluid outlet passageways or ports 340 that are in fluid communication with the respective fluid inlet passageway/ports 320. In operation, the fluid inlet ports 320 and the fluid outlet ports 340 allow a fluid, such as natural gas and the like, to flow through the modular valve assembly 20. In certain illustrative embodiments, such as the embodiment depicted in FIG. 3, the fluid inlet passageways/ports 320 in the seat plate 42 may be substantially axially aligned with the respective fluid outlet passageways/ports 340. Additionally, the seat plate 42 may also include receiving cavities 330 that are located downstream of each respective fluid inlet passageway/port 320. As is best shown in FIG. 3, each of the receiving cavities 330 is adapted to locate and firmly secure a reed valve module 46 within the modular valve assembly 20. In particular, FIG. 3 shows that the sidewalls of receiving cavities 330 laterally surround and encapsulate a respective reed valve module 46, e.g. on all four sides of the module 46. Furthermore, first and second (or upper and lower) retaining surfaces 331 and 332, in combination with the sidewalls of the receiving cavities 330, retain and secure the reed valve modules 46 in place within the reed valve module 20, as will be further described below. In other exemplary embodiments, the receiving cavities 330 may be provided entirely within the retainer plate 44 (not shown in FIGS. 3 and 4), and in at least some embodiments the receiving cavities 330 may be distributed partially between the seat plate 42 and the retainer plate 44 (also not shown in FIGS. 3 and 4). In still further illustrative embodiments, the receiving cavities 330 may be located either partially or entirely within a separate plate, such as the receiving cavity plate 43 that is shown in the embodiment depicted in FIG. 10, which may be sandwiched between the seat plate 42 and retainer plate 44, as is further described below.

In some disclosed embodiments, the modular valve assembly 20 may also include one or reed valve modules 46. In such embodiments, the modular valve assembly 20 may also be referred to herein and in the appended claims as a "modular reed valve assembly." As is best shown for this embodiment in FIG. 3, each reed valve module 46 may be positioned within a receiving cavity 330, which, as noted above, may be located entirely within the seat plate 42, entirely within the retainer plate 44, distributed partially between the seat plate 42 and the retainer plate 44, or within a separate receiving cavity plate 43. Furthermore, the reed valve modules are secured and retained in this position when the seat plate 42 is coupled to the retainer plate 44.

In one unique aspect of the exemplary disclosed modular valve assembly 20 shown in FIGS. 3 and 4, it should be understood that while the reed valve modules 46 are not directly connected, fastened, or attached to the seat plate 42, a first interfacing surface at the upper (e.g. inlet) end of each reed valve module 46 (as shown in the view depicted in FIG. 3) may be positioned closely adjacent to, or in abutting contact, with a first retaining surface 331 located at the upper end of the receiving cavity 330. As is shown for the illustrative embodiment depicted in FIG. 3, the first (upper) retaining surface 331 is typically located on the seat plate 42, and is adapted to retain the reed valve module 46 in place within the receiving cavity 330. As will be further described in conjunction with FIGS. 6-9 below, the first (upper) retaining surface 331 is also adapted to receive a cyclical differential pressure load that is transferred to the seat plate 42 by the first (upper) interfacing surface of the reed valve module 46 during operation of the modular reed valve assembly 20.

Similarly, while the reed valve modules 46 depicted in the illustrative embodiment shown in FIG. 3 are also not directly connected, fastened, or attached to the retainer plate 44, a second interfacing surface at the lower or distal (e.g. outlet) end of each reed valve module 46 may be positioned adjacent to, or in abutting contact with, a second retaining surface 332 located at the lower end of the receiving cavity 330. For the embodiment shown in FIG. 3, the second (lower) retaining surface 332 is located on the retainer plate 44. The two retaining surfaces 331 and 332 therefore "capture" the reed valve modules 46 within the receiving cavities 330. As such, the relative locations of, and interaction between, the retaining surfaces 331, 332 and the sidewalls of the receiving cavities 330 serve to capture and retain the reed valve modules 46 in place within the modular reed valve assembly 20. Furthermore, it should be understood that, with the exception of the exemplary embodiment shown in FIG. 15 below, this concept of "capturing" the reed valve modules 46 within the receiving cavities 330 between the retaining surfaces 331 and 332 eliminates the need to physically and directly attach the individual reed valve modules 46 to any components of the modular reed valve assembly 20, such as by the use of fasteners or other fastening means.

With continuing reference to FIG. 3, each individual fluid inlet port 320 corresponds to a single reed valve module 46 and to a respective first (upper) retaining surface 331, such that the total number of fluid inlet ports 320 in the seat plate 42 of a given modular reed valve assembly 20 is the same as the total number of retaining surfaces 331 on the seat plate 42 and the same as the total number of reed valve modules 46 installed in the valve assembly 20. Furthermore, a seating surface 640 (see, FIGS. 6-9) on each reed valve module 46—which may correspond to the "first (upper) interfacing surface" described above—is adapted to completely surround the entire periphery of a respective fluid inlet port 320 and "seat" against a respective first (upper) retaining surface 331 on the seat plate 42, thus acting to reduce or prevent fluid bypass and/or leakage around the reed valve modules 46 when the fluid flowing into the modular reed valve assembly 20 through the fluid inlet port 320 enters the reed valve module 46 through its respective fluid flow inlet 655 during valve operation. See, FIGS. 6-9, described below.

As shown in FIGS. 3 and 4, each fluid inlet port 320 may be a single opening that extends through at least a portion of the seat plate 42 so as to provide fluid communication to a corresponding reed valve module 46 positioned in the receiving cavity 330 therebelow. However, it should be understood by those of ordinary skill after a complete reading of the present disclosure that in certain exemplary embodiments, any one of the fluid inlet ports 320 disclosed herein may include two or more individual openings, which may be separated by, for example, one or more ribs or ligaments and the like (not shown in FIG. 3 or 4) without affecting the functionality of the disclosed modular reed valve assembly 20. In such embodiments, each of the two or more individual openings of the fluid inlet port 320 are adapted to provide fluid communication to the same single reed valve module 46 positioned in the receiving cavity 330 therebelow, and furthermore the seating surface 640 of the same single reed valve module 46 is adapted to completely surround the entire periphery of the two or more openings of the respective fluid inlet port 320 and "seat" against the first (upper) retaining surface 331 on the seat plate 42, as described above.

In some embodiments, the particular locations of the two retaining surfaces 331 and 332 may vary from those illustrated in FIG. 3, depending on the locations of the receiving cavities 330, which may be located entirely within the seat plate 42, entirely within the retainer plate 44, distributed partially between the seat plate 42 and retainer plate 44, or within a separate receiving cavity plate 43 as is described in conjunction with FIG. 10 below.

With continuing reference to FIGS. 3 and 4, each reed valve module 46 is designed as a self-contained modular unit that is adapted to be installed into the modular reed valve assembly 20 separately and independently of any of the other reed valve modules 46. Furthermore, each of the reed valve modules 46 that are installed in the modular reed valve assembly 20 are also adapted to operate independently from the other reed valve modules that are also contained within the modular reed valve assembly 20. In this context, it should be understood that the term "self-contained modular unit" as it is used in the following description and in the appended claims means a stand-alone, individual modular unit that individually controls a flow of fluid. Furthermore, the operation of any individual self-contained modular unit is separate from, and not dependent on, the operation of any other individual self-contained modular unit with a given modular valve assembly. As such, any individual reed valve module 46 will continue to operate, i.e. control a fluid flow, under conditions where one or more of the remaining reed valve modules 46 installed in the modular reed valve assembly 20 may be partially functional—or even completely nonfunctional—due to fouling, fatigue, mechanical damage, etc. Under such circumstances, each reed valve module 46, being a separately operating self-contained modular unit, would be substantially unaffected by any nonfunctional or partially functional reed valve modules 46 in the modular reed valve assembly 20.

As will be appreciated by persons of ordinary skill after a complete reading of the present disclosure, the amount of time that may be required to perform field repairs on a modular reed valve assembly 20 that is operating suboptimally due to the presence of one or more nonfunctional or partially functional reed valve modules 46 can be significantly reduced over the typical prior art valves. In particular, any underperforming reed valve modules 46 can be individually removed and replaced, or repaired, without having to also remove any properly functioning reed valve modules 46, due to the self-contained modular unit concept provided by the unique module designs disclosed herein.

With continuing reference to FIGS. 3 and 4, each fluid inlet passageway/port 320 may lead into a single receiving cavity 330, and the single receiving cavity 330 may in turn lead to a single corresponding fluid outlet passageway/port 340. In such embodiments, the receiving cavity 330 may be configured to contain only a single reed valve module 46. More specifically, each reed valve module 46 may be positioned as a single self-contained modular unit in its own respective receiving cavity 330—that is, alone and without any other reed valve modules 46—such that each reed valve module 46 can be separately and individually inserted into the single receiving cavity 330. Furthermore, in such embodiments, each individual reed valve module 46 may be physically separated from any adjacent reed valves modules 46 by a ligament (or ligaments) 333 located between each of the individual receiving cavities 330. In other embodiments, a plurality of fluid inlet ports 320, e.g. two or more, may lead into a single receiving cavity 330, and the single receiving cavity 330 may in turn lead to either a single outlet port 340 or a plurality of fluid outlet ports 340, depending on the particular design configuration of the modular reed valve assembly 20.

For example, a plurality of reed valve modules 46, e.g. two or more, may be inserted into the same receiving cavity 330 (not shown in FIGS. 3 and 4) such that the plurality of reed valve modules 46 positioned within the same receiving cavity 330 are not individually separated by ligaments 330. However, in order to reduce or prevent fluid bypass and/or leakage around the reed valve modules 46 in such embodiments, there is still a one-to-one correspondence between each individual reed valve module 46 and its respective fluid inlet port 320 so that the seating surface 640 on the module 46 completely surrounds the entire periphery of the respective fluid inlet port 320 and "seats" against a respective first retaining surface 331 on the seat plate 42, as previously described.

In embodiments wherein multiple reed valve modules are inserted into a single receiving cavity, at least one side—and in some cases, multiple sides—of each reed valves module 46 may not be immediately adjacent to a sidewall of the receiving cavity 330, but will instead be immediately adjacent to, and sometimes in abutting contact with, a side of at least one adjacent reed valve module 46 (see, FIG. 5, described in further detail below). Additionally, even though each side of each reed valve module 46 may not be immediately adjacent to a sidewall of the receiving cavity 330, the sidewalls of the single receiving cavity 330 will still laterally surround each of the plurality of reed valve modules 46 that are positioned within the single cavity on all sides. Furthermore, the first and second (upper and lower) retaining surfaces 331 and 332 also will still capture and retain the plurality of reed valve modules 46 within the single receiving cavity 330, e.g. without the need to physically and directly attach each module 46 to the modular reed valve assembly with fasteners or other fastening means. It should also be understood that the above described self-contained modular unit concept of the disclosed reed valve modules 46 is not affected by inserting two or more such reed valve modules 46 in the same receiving cavity 330, because the proper operation of any single reed valve module 46 does not depend on the operation (or non-operation) of any other reed valve module 46 within the same receiving cavity 330. Moreover, the removal and repair or replacement of one of the plurality of reed valve modules 46 does not require the removal or replacement of any other of the plurality of reed valve modules 46 that may be positioned within the same receiving cavity 330.

While various embodiments of the disclosed modular reed valve assembly 20 may include a plurality of reed valve modules 46, it should also be understood that other illustrative embodiments may include only one reed valve module 46 in full accordance with the present disclosure.

In certain exemplary embodiments, the seat plate 42 or retainer plate 44 may be integrated into a structural component of the machine in which the valve assembly is employed, e.g., a component of the frame 14—such as the wall of the cylinder 12—of the compressor 10 shown in FIGS. 1 and 2.

In operation, each reed valve module 46 individually and selectively controls the flow of a fluid through a fluid inlet passageway/port 320, into the reed valve module 46, and out of the modular reed valve assembly 20 through a corresponding fluid outlet passageway/port 340. Furthermore, the seat plate 42 and retainer plate 44 are configured to secure each of the reed valve modules 46 therebetween. Depending on the particular design parameters of a given modular valve assembly 20, the seat plate 42 may be formed from different types of materials, such as a metal, fiber reinforced composite, or some other suitable high-strength material and the like. In certain embodiments, the retainer plate 44 and any separate receiving cavity plate 43 (see, FIG. 10) may have lower strength requirements, but may also be made from any suitable material, such as a metal, fiber reinforced composite, or plastic and the like. It should be noted that, in other embodiments, any embodiment of the modular reed valve assemblies 20 disclosed herein may be configured to accommodate a valve unloading device, a clearance volume device, or other such devices that may commonly be located on valves known in the art.

Figure 5:
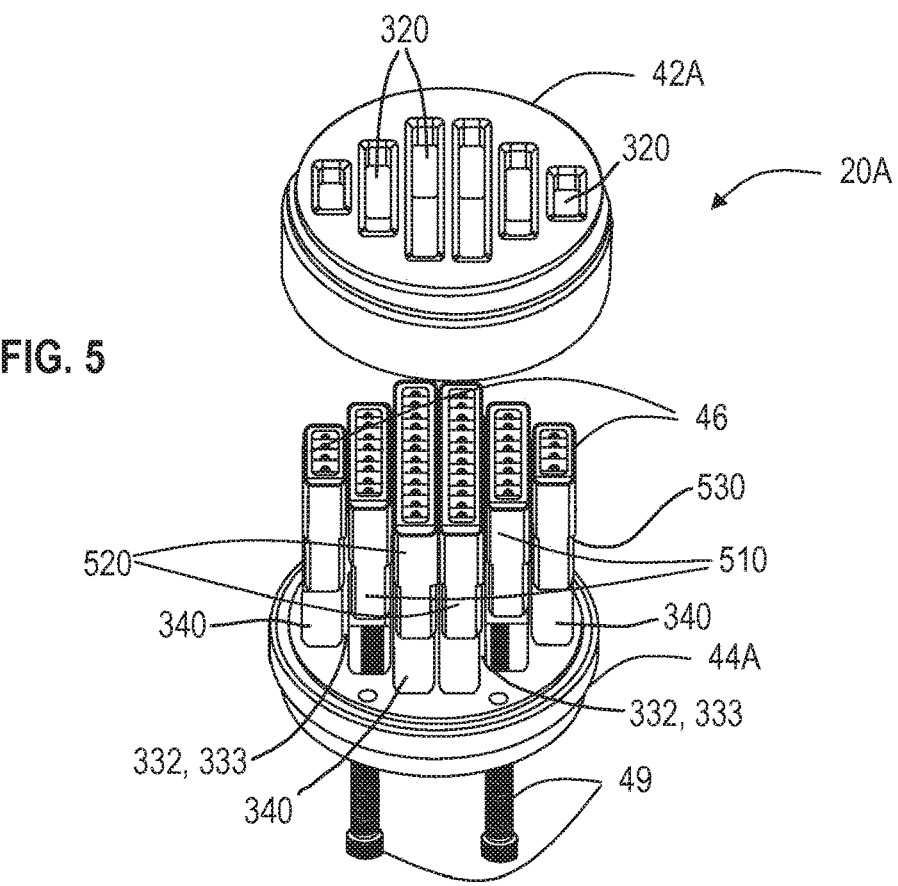
FIG. 5 is an exploded view of a modular reed valve assembly having reed valve modules of varying sizes in accordance with illustrative embodiments of the present disclosure.

FIG. 5 depicts another exemplary modular valve assembly 20A in accordance with some aspects of the present disclosure. Similar to the modular valve assembly 20 illustrated in FIGS. 3 and 4, the modular valve assembly 20A shown in FIG. 5 may include a seat plate 42A having a plurality of fluid inlet ports 320 and a retainer plate 44A having a plurality of fluid outlet ports 340, wherein the seat plate 42A is attached to the retainer plate 44A by means of a plurality of fasteners 49, such as cap screws, e.g. hex head cap screws or socket head cap screws, and the like.

In certain embodiments, the modular valve assembly 20A may include multiple reed valve modules of different sizes. For example, as is shown in the exemplary embodiment of FIG. 5, which has a reed valve module layout that is symmetrical about a central plane, the illustrative modular valve assembly 20A includes three pairs of reed valve modules 46, 510, and 520 (i.e. six reed valve modules in total), wherein each of the first pair of reed valve modules 46 are of a first size, each of the second pair of reed valve modules 510 are of a second size, and each of the third pair of reed valve modules 520 are of a third size. As can be seen in the particular depicted embodiment, each pair of reed valve modules 46, 510, and 520 may have substantially the same width (left to right in the view shown in FIG. 5) and successively greater lengths (up and down in the view of FIG. 5), such that the two reed valve modules 510 are both longer than the two reed valve modules 46 and the two reed valve modules 520 are both longer than the two reed valve modules 510. In this way, the length of each pair of self-contained modular reed valve units 46, 510, and 520 can be adjusted as necessary in order to maximize the flow area through the modular valve assembly 20A relative to the total area of the valve assembly 20A. Additionally, utilizing reed valve modules of such varying lengths (and/or widths) can generally reduce the total number of reed valve modules that need to be installed in the modular valve assembly, thus simplifying the assembly and/or servicing of the valve assembly.

In certain embodiments, the modular valve assembly 20A may include more than the three sizes of reed valve modules depicted in FIG. 5, e.g. four or more sizes, whereas in other embodiments the modular valve assembly may include fewer than three sizes of reed valve modules, e.g. two sizes. Furthermore, in at least some embodiments, there may be several different sizes of reed valve modules in which both the length and width of each reed valve module, or the width alone of each reed valve module, is optimally adjusted. In still further embodiments, differently sized reed valve modules may be distributed asymmetrically over the valve area, or wherein some or all of the differently sized reed valve modules are not provided in pairs.

With continuing reference to the embodiment depicted in FIG. 5, the reed valve modules 46/510/520 may be arranged laterally adjacent to one another such that upper portions of the two modules 520 are very closely adjacent to (or in abutting contact with) each other along one side, and are also very closely adjacent to (or in abutting contact) with one side of an upper portion of a respective module 510 along an opposite side. Additionally, an opposite side of the upper portion of each of the modules 510 is very closely adjacent to (or in abutting contact with) one side of an upper portion of a respective module 46. When a plurality of reed valve modules are arranged in this fashion, there is no ligament (such as the ligaments 333 shown in FIGS. 3 and 10) present between the sides of upper portions of the reed valve modules that are in abutting contact, although a ligament 333 would be present between each of the fluid inlet ports 320 in order to provide a first (upper) retaining surface 331 on the seat plate 42A (not shown in FIG. 5). Therefore, for the exemplary modular reed valve assembly 20A depicted in FIG. 5, the upper part of the retaining cavity 330 that is formed in the seat plate 42A (also not shown in FIG. 5) is a single upper retaining cavity—i.e., without any intervening ligaments—and the upper portions of all three pairs of reed valve modules 46/510/520 are positioned within the single upper retaining cavity.

As shown in FIG. 5, only the upper portions of the reed valve modules 46/510/520 are very closely adjacent to (or in abutting contact with) an adjacent reed valve module. Furthermore, the wall of each reed valve module 46/510/520 includes a stepped surface or lip 530 that is spaced apart from both the inlet and outlet ends of the module, such that the sides of the lower portions of the reed valve modules 46/510/520 are slightly offset from the sides of the respective upper portions, and the lower portions have a narrower width (left to right in the view shown in FIG. 5) than the upper portions. Accordingly, since the offset sides and narrower width provides a space between adjacent sides of the lower portions of the reed valve modules 46/510/520, ligaments 333 that are located between the lower portions of the reed valve module 46/510/520s can be accommodated in the retainer plate 44A. Therefore, the lower portion of each individual reed valve module 46/510/520 can be positioned within a corresponding individual lower part of a retaining cavity 330 that is formed in the retainer plate 44A. Furthermore, the upper surface of the ligament 333 in the retainer plate 44A may also provide the second (lower) retaining surface 332, and the reed valve modules 46/510/520 may thus be "captured" between the first (upper) retaining surface 331 on the seat plate 42A (not shown in FIG. 5) and the second (lower) retaining surface 332 on the retainer plate 44A.

Figure 6:
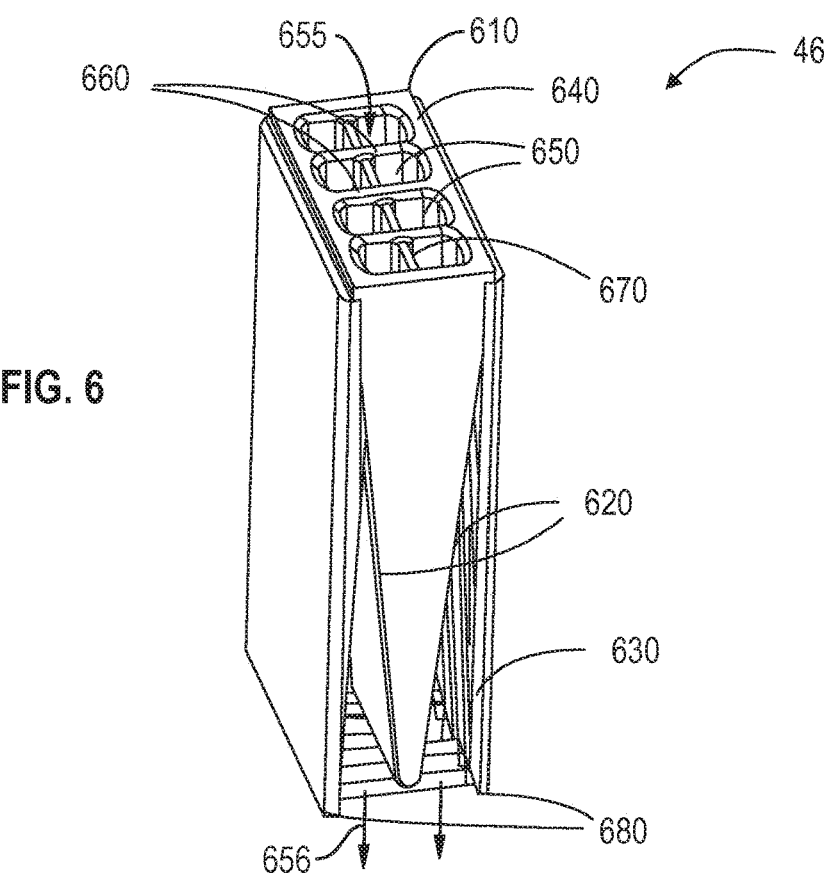
FIG. 6 is a perspective view of an assembled reed valve module in accordance with some exemplary aspects of the disclosed subject matter.
Figure 7:
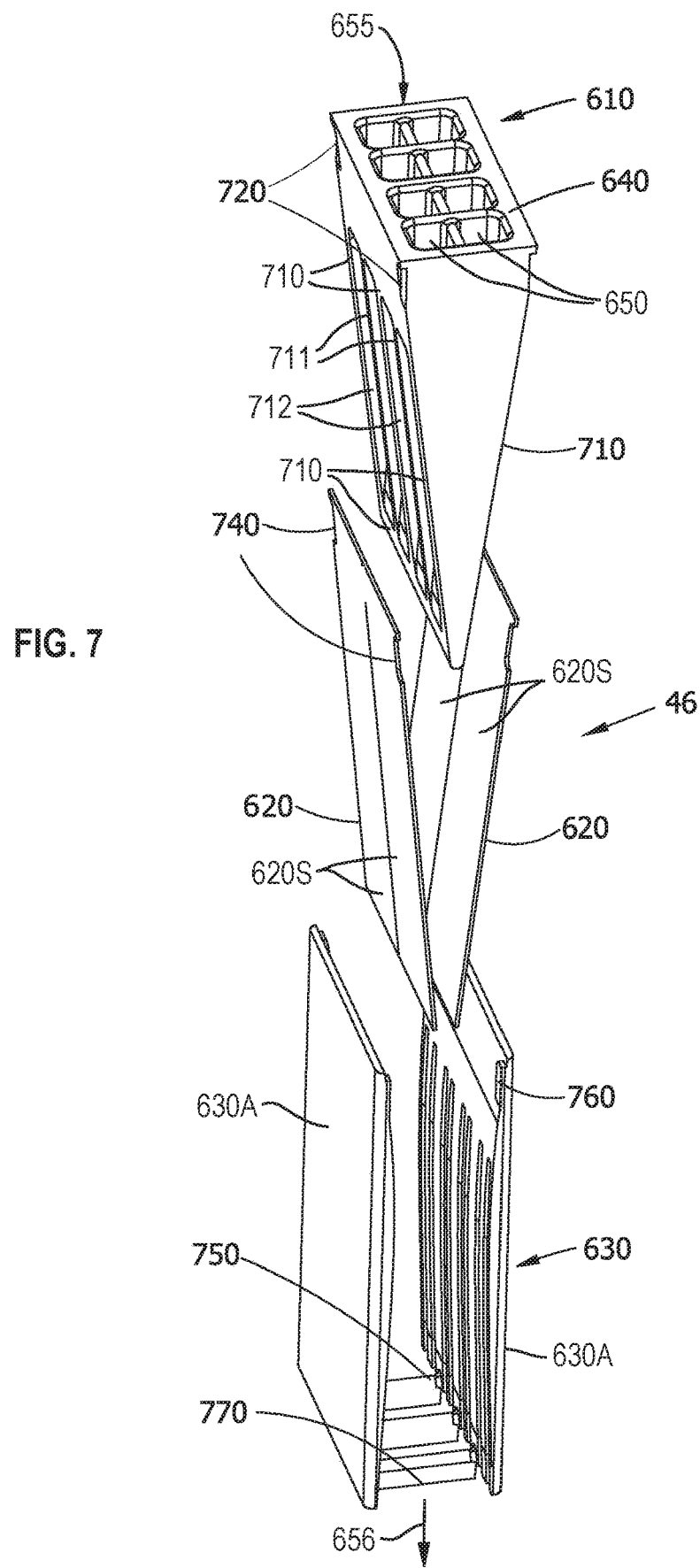
FIG. 7 is an exploded view of the illustrative reed valve module of FIG. 6 showing certain components of the sub-assembly in accordance with certain embodiments of the present disclosure.
Figure 8:
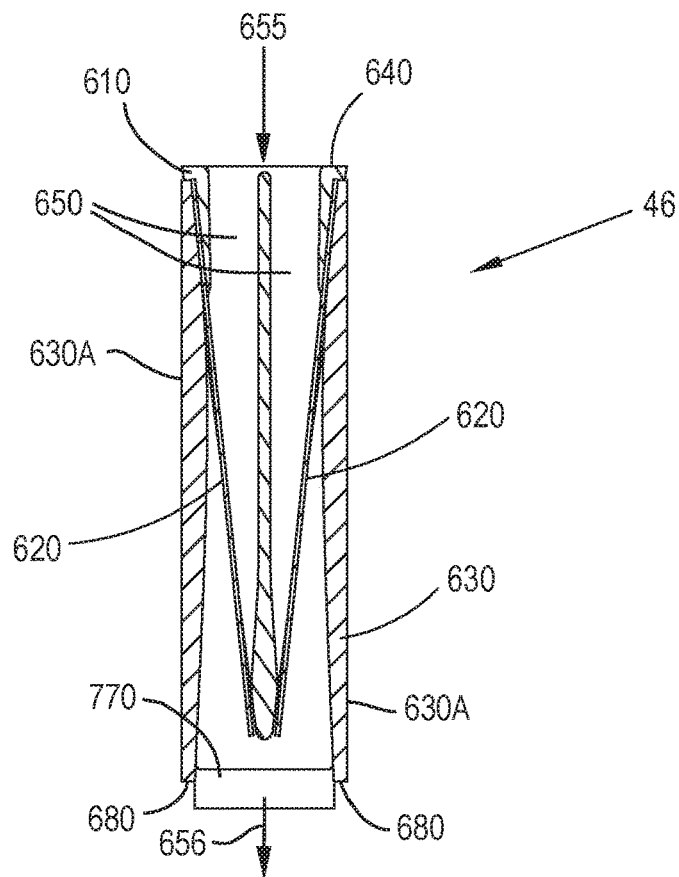
FIG. 8 is a cross-sectional side view of the exemplary reed valve module of FIG. 6 depicting the reed petals in a closed position according to certain disclosed embodiments.

FIGS. 6-8 provide illustrative details of an exemplary reed valve module 46 in accordance with certain embodiments of the present disclosure, wherein FIG. 6 is a perspective view of the exemplary reed valve module 46, FIG. 7 is an exploded perspective view of the illustrative reed valve module depicted in FIG. 6, and FIG. 8 is a cross-sectional side view of the reed valve module of FIG. 6. In some embodiments, the reed valve module 46 may include a module body 610, one or more reed petals 620, and a modular housing 630. In at least some embodiments, the modular housing 630 may also function as a petal guard (or petal stopper), as will be further described below. In certain aspects, the module body 610 and/or modular housing 630 may be made of plastic, either with or without carbon or glass fibers, and may be formed through a suitable manufacturing process such as injection molding, compression molding, or machining, and the like. Depending on the design parameters of the particular component, the amount of fiber contained may be determined based on obtaining an optimum amount of strength for the module body 610 and impact absorption for the reed petals 620 so as to increase the overall reliability of the reed valve module 46. It should be noted, however, that certain applications may dictate that the module body 610 and/or modular housing 630 be formed from metal or some other suitable high strength material through a suitable manufacturing process, such as metal injection molding, casting, powder metallurgy, or machining. When the module body 610 is made of metal and the reed petals 620 are also made of metal, plastic inserts (not shown) may be used in the module body 610 for the sealing face in order to soften the impact force of the reed petals 620. In other disclosed embodiments, the module body 610 and/or modular housing 630 may be made of metal with a relatively thick coating of plastic or elastomer.

While the module body 610 and the modular housing 630 may be made of the same material, it is not always necessary for the materials of these components to be the same. For example, in certain embodiments, the reed petals 620 may be stainless steel reed petals that are made from precision sheet strips using photo-chemical milling, stamping, water jet cutting, laser cutting, wire EDM, or other suitable manufacturing process. However, in other embodiments, the reed petals 620 may be made of steel, fiber reinforced composite material, or some other flexible, high fatigue strength material that is suitable for the particular application.

With continuing reference to FIGS. 6-8, the module body 610 includes a seating surface 640 that surrounds the entire periphery of a fluid flow inlet 655 of the reed valve module 46. Typically, the seating surface 640 would correspond to the first (upper) interfacing surface of the reed valve module 46 that is positioned adjacent to, or in abutting contact with, a retaining surface of a seat plate 42 (not shown in FIGS. 6-8), such as the retaining surface 331 shown in FIG. 3 and described above, when the reed valve module 46 is assembled into any one of the various modular reed valve assemblies disclosed herein. See, FIGS. 3-5, FIGS. 10-12, and FIG. 15. As noted previously, the seating surface 640 is also configured such that it completely surrounds the entire periphery of a respective one or more fluid inlet ports 320 and "seats" against the retaining surface of the seat plate 42, thus reducing or preventing fluid bypass and/or leakage around the reed valve module 46 during operation.

In some illustrative embodiments, the module body 610 may be divided into a plurality of flow passages 650 by one or more transverse ribs 660 that extend across the module body 610 from one side of the module body 610 to an opposite side of the module body 610. In other embodiments, one or more lateral ribs 670 may also extend between pairs of adjacent transverse ribs 660, and may further divide the flow passages 650. Additionally, the transverse ribs 660 and lateral ribs 670 may be sized and positioned so as to reinforce the module body 610, and the end faces 711 of one or more of the transverse ribs 660 may also act to support the reed petals 620 when the reed petals 620 are in the closed position and subject to a high differential pressure. In certain embodiments, there may be additional passages in the transverse ribs 660 and/or the lateral ribs 670 that connect one or more of the flow passages 650.

As shown in FIGS. 6-8, the flow passages 650 lead from the flow inlet 655 at the seating surface 640, which would typically be positioned adjacent to a fluid inlet port 320 (not shown; see, e.g. FIGS. 3-5 and FIGS. 10-12) of an assembled modular reed valve assembly 20, to one or more outlet openings 712 passing through one or more sealing faces 710 on the module body 610, such that a sealing face 710 surrounds the entire periphery of an outlet opening 712. In order to perform the necessary sealing function with a corresponding reed petal 620 (or a plurality of corresponding reed petals 620) as described below, the sealing faces 710 are formed to be flat. Furthermore, in certain embodiments the sealing face 710 may be oriented at a small angle from the vertical, that is, at a small angle from a plane that is substantially perpendicular to the seating surface 640, so that the fluid flow that is being controlled by the reed valve module 46 does not make any large angle turns as it passes through the module 46. For example, the sealing faces 710 may be at an angle relative to the substantially perpendicular plane that is in the range of approximately 5-15°, although it should be understood that smaller or larger angles may also be used.

In various exemplary embodiments disclosed herein, such as is illustrated in FIGS. 6-8, there are two sealing faces 710—e.g. one located on each of the two opposing sides of the module body 610—each of which is oriented at an angle to the vertical for each module body 610, as previously described. However, in other embodiments, the module body 610 may include only one sealing face 710 that is located on only one side of the module body 610 and oriented at an angle to the vertical. In other embodiments, there may be several sealing faces, such as the sealing faces 710C shown in the illustrative reed valve module 46D shown in FIG. 13. In certain other embodiments, the sealing faces 710 may be substantially vertical, that is, such that the sealing faces 710 are substantially perpendicular to the seating surface 640.

Corresponding to each sealing face 710, there are one or more reed petals 620 that lie flat against the sealing face 710 when the reed valve module 46 is in an assembled configuration, essentially sealing it. Each reed petal 620 has an initial (upper) portion that is used to secure the reed petal 620 in the assembled reed valve module 46 and a latter (lower) deflection portion that closes off the outlet openings 712 and seals against the sealing faces 710 on module body 610 when the fluid pressure at the fluid outlet port 340 of a modular valve assembly 20 is greater than the fluid pressure at the fluid inlet port 320. Additionally, the latter (lower) deflection portion of each reed petal 620 deflects so as to open up the outlet openings 712 passing through the sealing face 710 when the pressure at the fluid inlet port 320 is greater than the pressure at the fluid outlet port 340. Furthermore, it should be understood that during the portion of the operating cycle when the reed petals 620 are in the closed position and sealing against the sealing faces 710, the seating face 640—i.e., the first (upper) interfacing surface of the reed valve module 46 as described in conjunction with FIGS. 3-5 above—transfers the differential pressure load across the module 46 to the first (upper) retaining surface 331, thereby imposing the cyclic differential pressure load on the seat plate 42.

As is shown in the illustrative embodiment depicted in FIGS. 6-8, the initial (upper) secured portion of each reed petal 620 is typically positioned proximate the seating surface 640, i.e. near the upper end of the module body 610 (as depicted in the views shown in FIGS. 6-8), and the latter (lower) deflection portion of the reed petal 620 extends downward over the outlet openings 712 and the sealing faces 710 toward the lower end of the module body 610 (as depicted in the views shown in FIGS. 6-8).

As is best shown in the exploded view of FIG. 7, the latter (lower) deflection portion of the reed petals 620 may have slits 622 that divide the reed petals 620 into separate sealing elements 620S, which thus allows the separate sealing elements 620S of each such divided reed petal 620 to independently seal different outlet openings 712 on the sealing face 710 of the module body 610. Furthermore, as shown in FIG. 7, the initial (upper) secured portion of the reed petals 620 may have one or more cut outs 740 that engage with protrusions 760 on the modular housing 630 and corresponding slots 720 in the module body 610 that serve to mechanically secure the reed petals 620 in the assembled reed valve module 46.

As shown in FIGS. 6-8, the modular housing 630 may have walls 630A that are positioned adjacent to the reed petals 620 and the sealing faces 710 of the module body 610 when the reed valve module 46 is in the assembled configuration. In certain embodiments, an initial portion of the inside surface of the walls 630A of the modular housing 630 may be contoured to capture and secure the reed petals 620 against the module body 610. Additionally, in at least some embodiments, a latter portion of the inside surface of the walls 630A may be contoured to provide a surface for the reed petals 620 to impact against when the reed petals 620 are in a fully opened state, thus functioning as a petal guard. In at least one embodiment, one or more grooves 750 (see FIG. 7) may also be provided on the latter portion of the inside surface of the walls 630A in order to reduce stiction effects that may occur in services where liquids, such as lubricating oil and the like, may be present. In other embodiments, the modular housings/petal guards 630 may include a plurality of trap members 770 that are located at the bottom of the modular housing/petal guard 630 and proximate the fluid flow outlet 656 at the distal end of the assembled reed valve module 46, as shown in FIGS. 6-9. In general, the trap members 770 are preferably adapted to prevent any relatively large pieces that may break or come loose from the reed valve module 46 during operation, such as pieces of broken or damaged reed petals 620 and the like, from escaping and moving downstream of the reed valve module 46, and in particular to prevent such pieces from migrating to the cylinder 12 of a compressor 10 and causing mechanical damage that may be difficult and time consuming to repair.

In certain aspects, fluid flow outlet 656 at the distal end of each reed valve module 46 may be positioned adjacent to a fluid outlet passageway/port 340 of an illustrative modular valve assembly 20 in accordance with various exemplary embodiments of the present disclosure, thereby allowing the fluid that flows through the reed valve module 46 to pass through the fluid outlet port 340 and out of the modular reed valve assembly 20. In some embodiments, the bottom or lower end 680 of the modular housing/petal guard 630 (as shown in the view depicted in FIGS. 6-9) at the distal end of the reed valve module 46 may be designed to be larger than the fluid outlet passageway/port 340 in the retainer plate 44 of a modular valve assembly 20 in which the reed valve module 46 is installed. In such embodiments, the bottom 680 of the modular housing 630 may therefore correspond to the second (lower) interfacing surface of the reed valve module 46, and as such would engage with, or abut against, a retaining surface of the retainer plate 44, such as the second (lower) retaining surface 332 shown in FIGS. 3-4 and described above. In such a configuration, the retaining surface, e.g. the retaining surface 332, may therefore act to capture and retain the reed valve module 46 within a receiving cavity 330 of an assembled modular reed valve assembly 20, as previously described. In some disclosed embodiments, the modular housing 630 may also have side walls (not shown) that extend between and connect the contoured walls 630A on opposing sides of the modular housing 630.

In at least some embodiments, the modular housing/petal guard 630 may not include the trap members 770, and in other embodiments the modular housing 630 may have neither the trap members 770 nor the contoured side walls 630A. In such embodiments, the modular housing 630 may be held in position adjacent to the sealing faces 710 when the reed valve module 46 is placed in a receiving cavity 330. (See, FIGS. 11 and 12.) In other embodiments, instead of the second (lower) interfacing surface of the reed valve module 46 being the bottom 680 of the modular housing 630, other module configurations may be used to confine and secure the reed valve module 46 within a receiving cavity 330 of modular reed valve assembly 20. For example, the lip 530 shown in FIG. 5 and described above may be provided as the second (lower) interfacing surface of the reed valve module 46 on the walls 630A of the petal guard 630. In such embodiments, the receiving cavity 330 may be configured to include a corresponding step that provides a retaining surface, such as the second (lower) retaining surface 332 shown in FIGS. 3-5, so that the second (lower) interfacing surface of the reed valve module 46 on the lip 530 engages the stepped retaining surface in the receiving cavity 330, thereby securing the reed valve module 46 in the modular reed valve assembly 20 as previously described. However, it should be appreciated by those skilled in the art after a complete reading of the present disclosure that alternative or additional configurations may also be used to secure the reed valve module 46 in any one of the various modular valve assemblies 20 disclosed herein.

In various disclosed embodiments, the cutouts 740, protrusions 760, and slots 720 are adapted to locate a reed petal 620 against a sealing face 710, and in conjunction with a friction force between the reed petals 20, the modular housing/petal guard 630, and the module body 610, these elements may act as a positive restraint that prevents the reed petal 6230 from dropping away from the module body 610. In other embodiments, the protrusion 760 may be located on the module body 610 and the corresponding slot 720 may be located on the modular housing 630. In at least some embodiments, such as where the sealing faces 710 are at a non-perpendicular angle to the seating surface 640, the reed petals 620 may be wedged between the module body 610 and the modular housing/petal guard 630 in the reed valve module 46. In certain other embodiments, such as where the sealing face 710 is vertical (i.e. substantially perpendicular to the seating surface 640), the reed petals 620 may be held in place in the reed valve module 46 by means of the clamping force produced when the module is pressed into the receiving cavity 330. This clamping force is induced by an interference fit between the reed valve module 46 and the walls of the receiving cavity 330, or by suitably shaping the reed valve module 46 and receiving cavity 330 walls to provide the necessary clamping force. In certain other embodiments, the modular housing 630 may be eliminated altogether from the reed valve module 46, in which case the inner walls of the receiving cavity 330 may be contoured similar to the inside surface of the walls 630A of the modular housing/petal guard 630 as shown in FIGS. 6-8 so that it provides the same function (see FIGS. 11-12).

Advantageously, in the embodiments illustrated in FIGS. 3-8, the modular reed valve assembly 20 is configured to facilitate efficient servicing or repair. Notably, all the wear is preferably contained within the various component that make up the reed valve module 46, including the reed petals 620 (which may wear due to fatigue and impact), the module body 610, the sealing faces 710 (which is subject to repeated impacts from the reed petal 620), and the modular housing/petal guard 630 (which is also subject to impacts from the reed petals 620 during opening of the valve). The preferred method of servicing of the modular reed valve assembly 20 is to simply replace all the reed valve modules 46 at a pre-established maintenance time. Additionally, with designs of the modular reed valve assemblies 20 disclosed herein there is no machining required for the valve seat plate 42 or the valve retainer plate 44, as these components typically do not experience wear as is the case with prior art plate valve, poppet valve, channel valve, and reed valve assemblies. Furthermore, the self-contained modular unit design concept disclosed herein allows each reed valve module 46 to come pre-assembled and tested for quality direct from the factory, thus eliminating the need for having expensive and complex testing equipment available to test assembled modular reed valve assembly 20 after maintenance or repairs have been performed. The refurbishing and repair of these modular reed valve assemblies 20 can therefore be done relatively quickly in the field, thereby substantially reducing the direct cost of the repairs and the expense associated with down time of the equipment. Moreover, the self-contained modular unit design concept of the reed valve modules 46 substantially eliminates the need to replace the more expensive components of the modular reed valve assembly 20, such as the seat plate 42 and retainer plate 44, making the disclosed modular reed valve assemblies 20 highly cost effective over the life of the machine. By comparison, the seat plate 42 and retainer plate 44 or guard for many prior art poppet valve, plate valve, ring valve, channel valve, and reed valve design typically must be replaced after the components have been refurbished only a few number of times. Additionally, it should also be appreciated by the ordinarily skilled artisan after a complete reading of the present disclosure that it is also possible to replace individual components of any reed valve module 46 in the field, such as the reed petals 620, the modular housing/petal guard 630, and/or the module body 610. Accordingly, since the self-contained modular unit design concept disclosed herein allows a single individual reed valve module 46 to be removed from a modular reed valve assembly 20, any damaged or worn components may be replaced as necessary, and the repaired/refurbished reed valve module 46 may be reinstalled without having to remove or replace any other reed valve modules 46 contained within the modular reed valve assembly 20.

The operation of an illustrative modular reed valve assembly 20 according to the present disclosure can best be described in conjunction with the partial cross-sectional perspective view of the modular valve assembly 20 shown in FIG. 3 and the side cross-sectional view of the reed valve module shown in FIG. 8. For example, when the pressure of the fluid above the seat plate 42 of the modular reed valve assembly 20 is higher than the pressure below the retainer plate 44, the differential pressure across the reed petals 620 in the reed valve modules 46 causes the reed petals 620 to deflect and sets each of the reed valve modules 46, and therefore the modular reed valve assembly 20, in an open state. Fluid then moves from the higher pressure zone above the seat plate 42 (as shown in the view of FIG. 3), into the modular reed valve 20 through the fluid inlet ports 320 in the seat plate 42, through the module body 610 of each reed valve module 46, through the trap members 770 of the modular housing/petal guard 630 (when used), and finally out of the modular reed valve assembly 20 through the fluid outlet passageways/ports 340 in the retainer plate 44 and into the lower pressure zone. When the fluid pressure on both sides of the modular reed valve assembly 20 equalizes, or when the fluid pressure below the retainer plate 44 becomes higher than the pressure above the seat plate 42, the reed petals 620 close against the sealing faces 710 (FIG. 7), effectively sealing off flow through the module body 610. With the reed valve modules 46 in this closed (sealing) position, the modular reed valve assembly 20 does not allow fluid to flow from below the retainer plate 44 to above the seat plate 42, even when the pressure below the retainer plate 44 is substantially higher than the pressure above the seat plate 42, because each reed valve module 46 acts as a one-way valve that permits the fluid flow in only direction, that is, from above the seat plate 42 to below the retainer plate 44.

Figure 9:
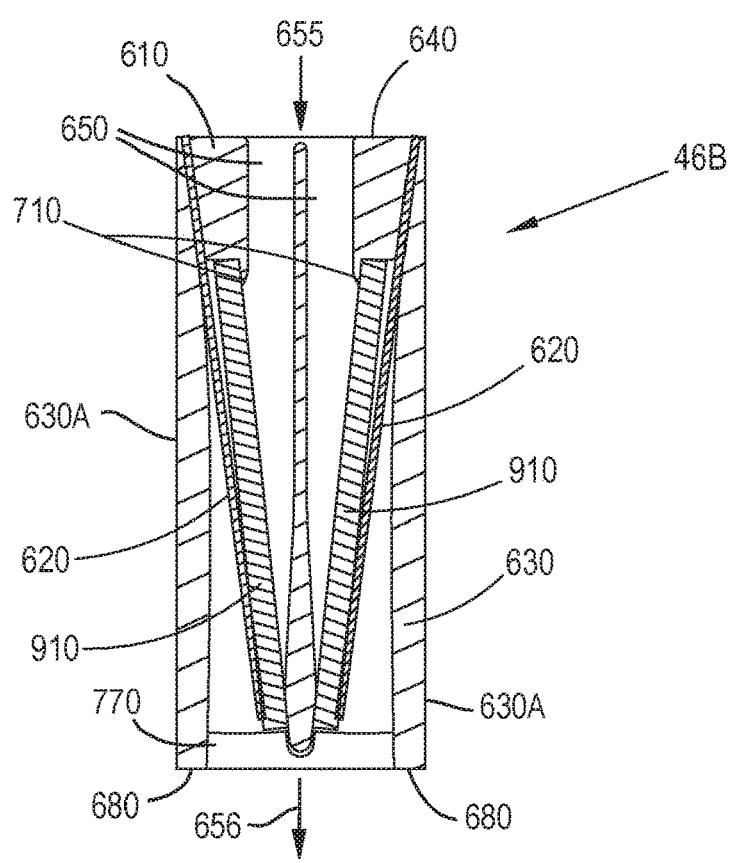
FIG. 9 is a cross-sectional view of another exemplary reed valve sub-assembly module having both inner reed petals and outer reed petals in accordance with another exemplary embodiment of the present disclosure.

FIG. 9 is a cross-sectional side view of another exemplary reed valve module 46B in accordance with certain embodiments of the present disclosure, wherein the exemplary reed valve module 46B may include a set of inner reed petals 910 in addition to a set of outer reed petals 620. As shown in FIG. 9, the inner reed petals 910 may be pressed against the respective sealing faces 710 by the outer reed petals 620, such that the inner reed petals 910 contact and seal against the sealing faces 710 on the module body 610 when the reed valve module 46B is in the closed position.

FIG. 10 depicts another exemplary modular reed valve assembly 20B in accordance with certain disclosed embodiments. As is shown in FIG. 10, the receiving cavities 330 may be located in a separate structural element or plate 43, sometimes referred to herein and in the appended claims as a "receiving cavity plate," that is positioned or "sandwiched" between the seat plate 42 and the retainer plate 44. Furthermore, as with the embodiment depicted in FIG. 3, the receiving cavities 330 may also laterally surround the reed valve modules 46 on all sides, and the first and second (upper and lower) retaining surfaces 331 and 332 may also capture and secure the reed valve modules 46 within the receiving recesses 330. Additionally, the fluid inlet passageways/ports 320 are in fluid communication with the fluid outlet passageways/ports 340, e.g. by way of the receiving cavities 330 positioned in the receiving cavity plate 43, and the inlet passageways/ports 320, the receiving cavities 330, and the fluid outlet ports 340 may be substantially axially aligned. Description of other features of modular reed valve assembly 20B shown in FIG. 10 may be found in conjunction with the description of FIGS. 3-8 above.

Figure 11:
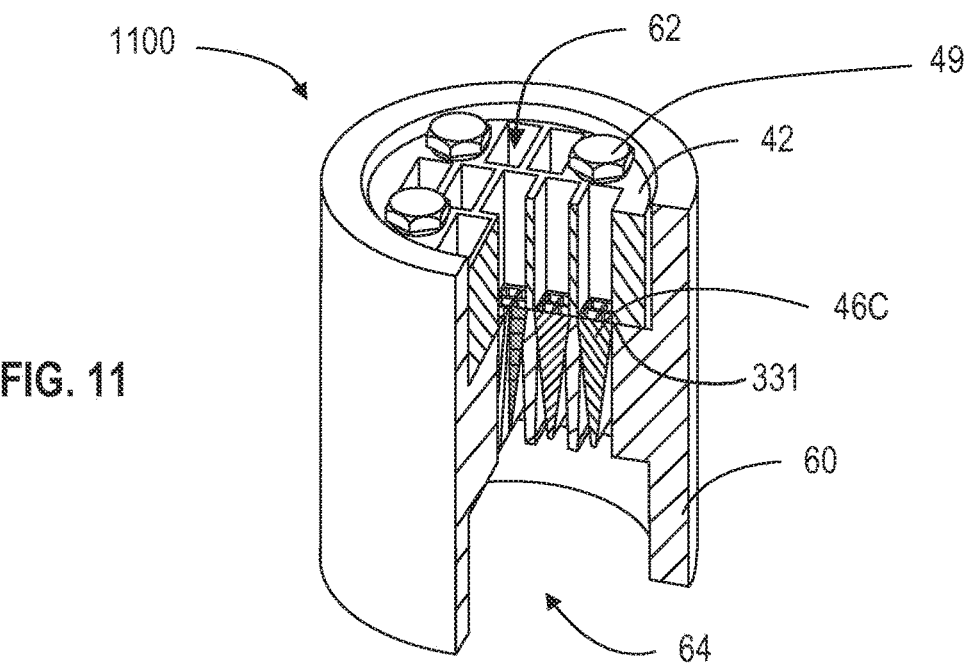
FIG. 11 is a partial cross-sectional perspective view of an exemplary flow control device using illustrative reed valve modules of the present disclosure in which part of each reed valve module is integrated into the device structure in accordance with certain exemplary embodiments of the disclosed subject matter.
Figure 12:
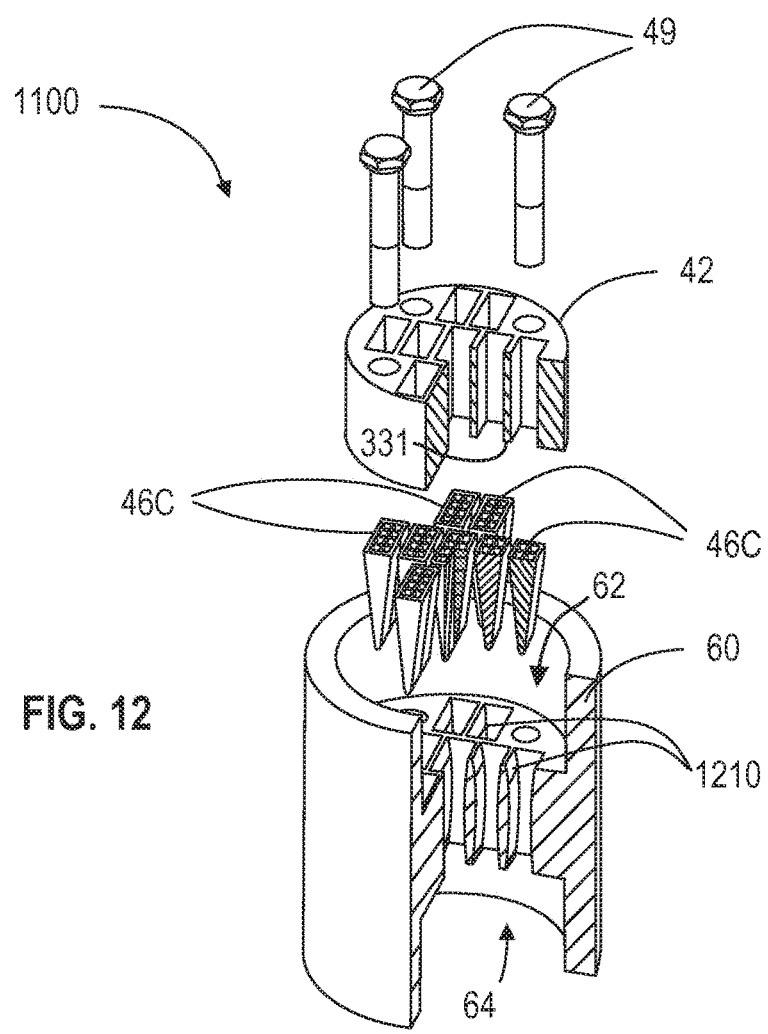
FIG. 12 is an exploded view the flow control device depicted in FIG. 11.

FIG. 11 is a partial cross-sectional perspective view of an illustrative flow control device 1100, and FIG. 12 is an exploded view of the exemplary flow control device 1100 depicted FIG. 11. As shown in FIGS. 11 and 12, the flow control device 1100 may incorporate certain aspects of the previously described modular reed valve assembly 20 in accordance with certain illustrative embodiments of the present disclosure. For example, the flow control device 1100, which could be representative of a machine or machine component that is adapted to control a flow of fluid, such as a compressor cylinder, an engine, or a process flow pipe, may include a frame 60 that is divided into two volume regions 62 and 64. Additionally, certain elements of a modular reed valve assembly may be incorporated in the flow control device 1100 that allow fluid to flow from volume region 62 to volume region 64, but that do not allow fluid to flow in the reverse direction from volume region 64 to volume region 62, i.e., a one-way valve. In such exemplary embodiments, a plurality of reed valve modules 46C may be used to control the flow from volume region 62 to volume region 64. However, while certain aspects of the reed valve modules 46C may have a similar configuration to the reed valve modules 46 illustrated in FIGS. 6-8 and described above, the reed valve modules 46C do not have the petal guards 630 of the reed valve modules 46 that are shown in FIGS. 6-8. Instead, the illustrative reed valve modules 46C (i.e. without petal guards 630) are positioned in receiving cavities 1210 that are an integral part of the frame 60, wherein the inner surfaces of the receiving cavities 1210 are contoured in such a manner as to serve the same function as the inner surfaces of the walls 630A of the petal guard 630 shown in FIGS. 6-8. Accordingly, the contoured inner surfaces of the receiving cavities 1210 clamp the reed petals 620 to the module body 610, thus preventing the module body 610 from falling out of the receiving cavity 1210, and they further limit the excursion of the reed petals 620 when the reed valve modules 46C open. Additionally, the reed valve modules 46C are secured in the receiving cavities 1210 by means of a seat plate 42 and fastening means, such as one or more screws 49. Therefore, the net effect of this exemplary configuration is that the receiving cavities 1210 may be located in a component that generally corresponds to the "retainer plate" of other disclosed embodiments of the modular reed valve assembly 20 (see, e.g. the detailed description of FIGS. 3 and 4 above), and that the "retainer plate" component may be integrated directly into the frame 60. Additionally, it should also be appreciated by the ordinarily skilled artisan after a complete reading of the present disclosure that in certain other embodiments, the "seat plate" component may be integrated directly into the frame 60, in which case a separate removable retainer plate would be utilized so as to allow for the installation and/or removal of the reed valve modules 46C.

Figure 13:
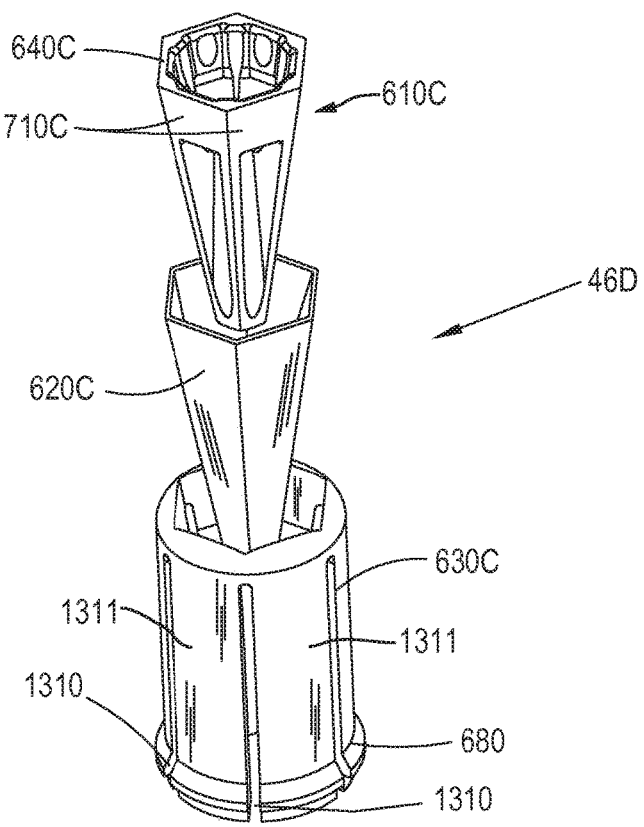
FIG. 13 is an exploded view of an exemplary reed valve module having an internal securing mechanism in accordance with certain aspects of the present disclosure.
Figure 14:
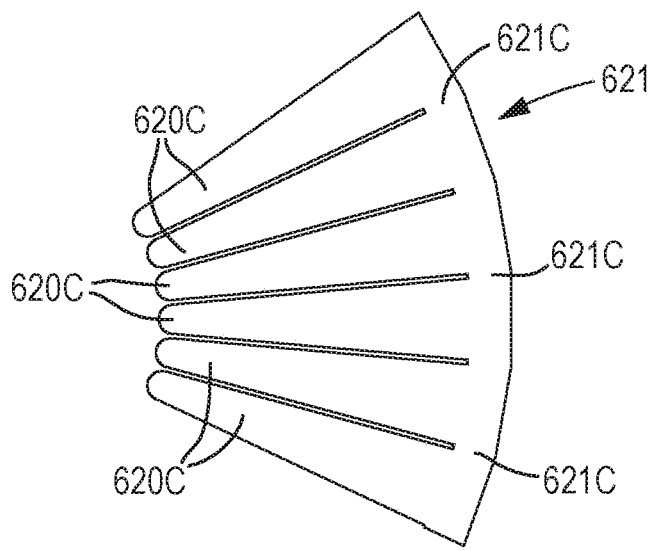
FIG. 14 is top view of a single valve petal in an unbent state that covers multiple sealing faces of the exemplary reed valve module shown in FIG. 13.

FIG. 13 illustrates an exemplary reed valve module sub-assembly 46D in accordance with certain other exemplary embodiments, wherein the various components of the reed valve module 46D are shown in an exploded view. As shown in FIG. 13, the reed valve module 46D includes a valve module body 610C having a substantially hexagonal shape, which in turn has a seating surface 640C at the top (i.e. at the flow inlet end of the reed valve module 46D) and six sealing faces 710C distributed around the periphery of the module body 610C. In some embodiments, the reed valve module 46D may consist of one or more reed petals 620C that are adapted to seal the individual sealing faces 710C. FIG. 14 depicts a particular embodiment wherein the one or more reed petals 620C may be a plurality of contiguous reed petals 620C that are formed as a single reed petal unit 621 (depicted in FIG. 14 in an unbent state) in which each of the contiguous reed petals 620C is contiguously connected to an adjacent contiguous reed petal 620C by a connecting portion 621C. Furthermore, the single reed petal unit 621 may be formed into a suitable shape, e.g. by bending, wherein each of the individual contiguous reed petals 621C covers a respective one of the six sealing faces 710C of the module body 610C. Thereafter, the module body 610C and reed petals 620C may be secured in a modular housing/petal guard 630C when the reed valve module sub-assembly 46C is assembled into the exemplary modular reed valve assembly 20D shown in FIG. 15.

With continuing reference to FIG. 13, one embodiment of the modular housing/petal guard 630C may be a snap-fit design that is adapted to eliminate the use of a retainer plate, separate fastener or other separate retaining means, such as a screw/nut combination and the like, in the modular reed valve assembly 20D. As is shown in the depicted embodiment, the modular housing 630C may have a substantially cylindrical or tubular shape. Furthermore, the modular housing 630C may include a plurality of longitudinal slits 1310 that are formed in and run vertically (as depicted in the view of FIG. 13) along a portion of the length of the modular housing 630C, thus separating the modular housing 630C into a plurality of modular housing segments 1311. Additionally, a plurality of protrusions 680 may run circumferentially around the modular housing 630C between each of the longitudinal slits 1310 such that the protrusions 680 are located on the modular housing segments 1311. The combination of the longitudinal slits 1310 and the circumferential protrusions 680 on each of the modular housing segments 1311 enable the reed valve module sub-assemblies 46D to be "snapped" into place without the need for a separate fastener or other separate retaining means, e.g. stud(s) and nut(s), when the modular reed valve sub-assembly 46D is installed in a seat plate 42D of the modular reed valve assembly 20D, as will be further described below.

Figure 15:
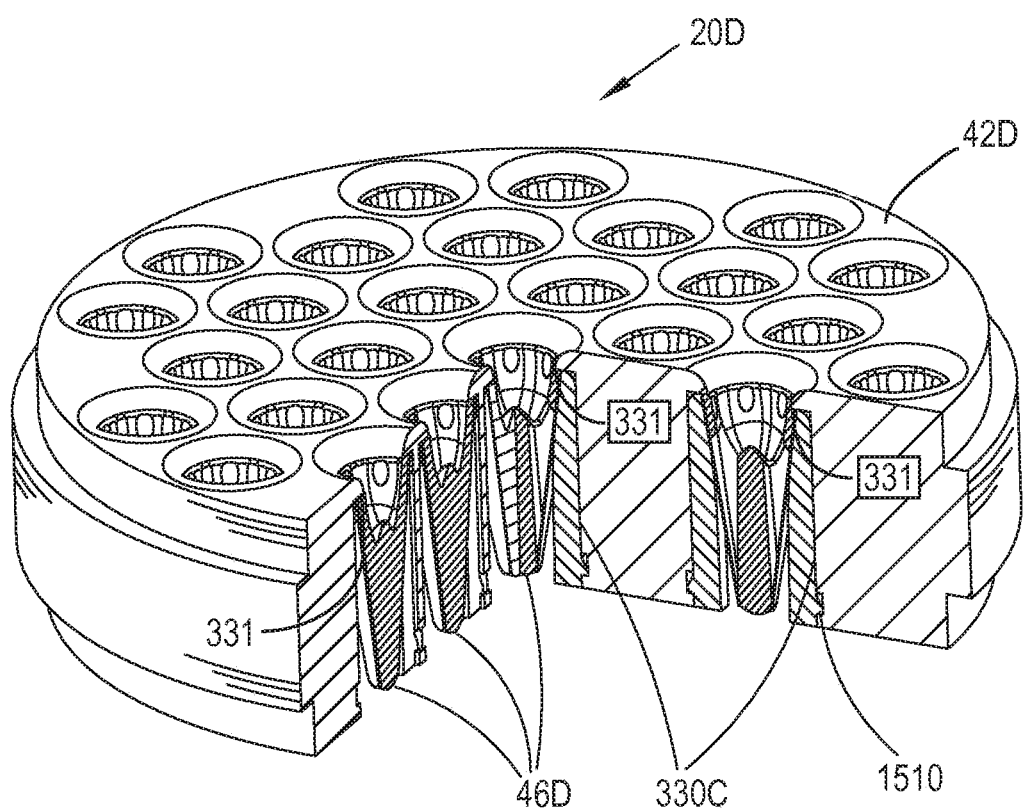
FIG. 15 is a partial cross-sectional perspective view of an exemplary modular reed valve assembly depicting the internal securing mechanism of the illustrative reed valve module shown in FIG. 13 in accordance with one embodiment disclosed herein.

FIG. 15 is a partial cross-section perspective view of the exemplary modular reed valve assembly 20D in accordance with certain disclosed embodiments. As noted above, the need for a retainer plate, separate fasteners or other separate retaining means—such as the stud(s) and nut(s) that are shown and described in conjunction with other illustrative modular reed valve assemblies 20, 20B, and 1100 of the present disclosure—has been eliminated by the use of the snap-fit mechanism on the reed valve module sub-assembly 46D, an embodiment of which is depicted in FIG. 13. In the depicted embodiment, each of the receiving cavities 330C in the seat plate 42D may include a circumferential groove 1510 that is adapted to receive the circumferential protrusions 680 located on the outside surface of the modular housing/petal guards 630C, as shown in FIG. 13. Furthermore, the longitudinal slits 1310 of the snap-fit design are adapted to allow each of the modular housing segments 1311 to flex inward as the reed valve module sub-assemblies 46D are inserted into the respective receiving cavities 330C so that the circumferential protrusions 680 can "snap" into place inside of the circumferential groove 1510.

For most disclosed embodiments, it should generally be understood that the fluid travels in an essentially straight path during its passage through each the various illustrative modular reed valve assemblies of the present disclosure, that is, with very little valve losses due to fluid turning and/or redirection. By contrast, compressors utilizing known prior art designs for plate valves, poppet valves, channel valves, ring valves, and/or reed valves often have large valve losses because the fluid may be forced to make two right angle turns in order to traverse the sealing element(s). Additionally, the design of the disclosed reed valve modules and the flow characteristics of this design allow a more effective coverage of an available valve area with fluid flow area when utilizing any of the illustrative embodiments disclosed herein, generally resulting in a more efficient valve when compared to existing prior art plate valves, ring valves, poppet valves, channel valves, and/or reed valves.

Additionally, it will be appreciated that, in the illustrative embodiments disclosed herein, if a foreign body, such as rust, passes through the modular reed valve assembly 20, the damage is typically limited to one or two flow paths 650 within a single reed valve module 46 because, as noted previously, the flow path provided by each individual reed valve module 46 is independent of that of any other reed valve module 46 contained within the modular reed valve assembly 20. Furthermore, since a typical modular reed valve assembly 20 may consist of several reed valve modules 46, the modular reed valve assembly 20 may continue to operate effectively until a planned shutdown allows the affected reed valve module(s) 46 to be repaired or replaced, thus saving money for the operator. On the other hand, in the case of existing prior art valve designs, any such incident would lead to a more urgent repair situation, such as in the case of machines that utilize plate valves having only one sealing element, wherein such damage would require immediate shutdown and repair.

In one embodiment, the modular housings/petal guards may be composed of a plastic containing a predetermined amount of fiber, e.g. 0-25%, so as to provide an optimum combination of strength for the operating conditions and the ability to absorb impacts and diffuse the energy of the reed petals. In other embodiments, the reed valve module body may be composed of a plastic containing a predetermined amount of fiber, e.g. 0-60%, so as to provide an optimum combination of strength for the body at the anticipated operating conditions and an ability to absorb impacts of the reed petal or reed petals, depending on the particular design. In further illustrative embodiments, the reed valve body may be made of a metal that is formed through a metal injection molding process. In at least some embodiments, the reed petals may be made of fiber reinforced composites so as to improve reliability, and in certain embodiments the modular housings/petal guards may be made of a metal that formed through a metal injection molding process.

The particular embodiments disclosed above are illustrative only, as the subject matter defined by the appended claims may be modified and practiced in different but equivalent manners apparent to those skilled in the art having the benefit of the teachings herein. For example, some or all of the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the claimed subject matter. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes or structures may or may not be required. Accordingly, the protection sought herein is as set forth in the claims below.

What is claimed:

1. A reed valve module, comprising:
    a module body, comprising a seating surface and a sealing face;
    a housing having an interfacing surface and a bottom that is located at a distal end of the reed valve module opposite of the seating surface, wherein the housing comprises a first wall portion having an inner surface, and a second wall portion having an inner surface; and
    a reed petal that is positioned adjacent to the sealing face and including:
        an upper portion that is used to secure the reed petal, and
        a lower portion that is adapted to seal against the sealing face when the reed petal is in a closed position and to deflect away from the sealing face when the reed petal is in an open position,
    wherein the reed valve module is a self-contained modular unit that is adapted to be inserted into a receiving cavity of a modular reed valve assembly such that the seating surface is positioned adjacent to a first retaining surface of the modular reed valve assembly and the interfacing surface is positioned adjacent to a second retaining surface of the modular reed valve assembly, wherein the reed valve module is adapted to be pressed, captured, and retained within the modular reed valve assembly between the first and second retaining surfaces, wherein the inner surface of the first wall portion and the sealing face are configured so that pressing the reed valve module between the first and second retaining surfaces causes the inner surface of the first wall portion to frictionally clamp the upper portion of the reed petal in place against the sealing face, and wherein the inner surface of the second wall portion is adapted to act as a petal guard to stop the lower portion of the reed petal when the lower portion of the reed petal deflects away from the sealing face.

2. The reed valve module of claim 1, wherein the seating surface surrounds an entire periphery of a fluid flow inlet of the reed valve module and the sealing face surrounds an entire periphery of an outlet opening passing through the module body.

3. The reed valve module of claim 1, wherein the reed valve module is adapted to be laterally surrounded on all sides by sidewalls of the receiving cavity of the modular reed valve assembly.

4. The reed valve module of claim 1, wherein the bottom of the housing comprises the interfacing surface.

5. The reed valve module of claim 1, wherein the housing further comprises a lip that is spaced apart from and positioned between the seating surface and the bottom of the housing, the lip comprising the interfacing surface.

6. The reed valve module of claim 1, wherein the sealing face on the module body is at an angle in a range of between 5 and 15 degrees relative to a plane perpendicular to the seating surface on the module body.

7. The reed valve module of claim 1, wherein the seating surface of the reed valve module is adapted to completely surround an entire periphery of a fluid inlet port of the modular reed valve assembly.

8. A mechanical device, comprising:
    a frame comprising at least two fluid chambers; and
    at least one reed valve module in accordance with claim 1, wherein the at least one reed valve module is connected to the frame and adapted to control a flow of a fluid between the at least two fluid chambers.

9. The reed valve module of claim 1, wherein the module body is configured to be retained inside the housing under a pressure differential across the reed valve module by a compressive force applied on the seating surface of the module body by the first retaining surface.

10. The reed valve module of claim 1, wherein the bottom of the housing includes trap members.

11. The reed valve module of claim 1, wherein the reed valve module is adapted to be inserted in the receiving cavity of the modular reed valve assembly together with a second reed valve module.

12. The reed valve module of claim 11, wherein the reed valve module is adapted to be inserted in and removed from the receiving cavity while the second reed valve module remains in place within the receiving cavity.

13. The reed valve module of claim 1, wherein the module body further comprises a rib that reinforces the module body when the reed valve module is exposed to a differential pressure.

14. The reed valve module of claim 5, wherein the rib supports the reed petal when the reed valve module is exposed to said differential pressure and the reed petal is in the closed position.

15. The reed valve module of claim 13, wherein the rib extends across the module body.

16. The reed valve module of claim 1, wherein the module body further comprises a second sealing face, the reed valve module further comprising a second reed petal that is positioned adjacent to the second sealing face and adapted to seal against the second sealing face when the second reed petal is in a second closed position.

17. The reed valve module of claim 16, wherein the sealing face is adjacent to the second sealing face.

18. The reed valve module of claim 17,
    wherein the housing comprises a plurality of wall portions oriented vertically,
        wherein the sealing face and the second sealing face are oriented at an angle from a vertical orientation; and
    wherein the reed valve module further comprises a plurality of ribs oriented vertically,
        wherein at least one of the plurality of ribs extends across the module body,
        wherein at least one of the plurality of ribs supports the reed petal when the reed valve module is exposed to a differential pressure and the reed petal is in the closed position, and wherein at least one of the plurality of ribs supports the second reed petal when the reed valve module is exposed to said differential pressure and the second reed petal is in the second closed position.

19. A modular reed valve assembly, comprising:
    a structure comprising a receiving cavity; and a reed valve module positioned in the receiving cavity, the reed valve module comprising:
  a module body comprising a seating surface, and a sealing face;
  a housing having an interfacing surface and a bottom that is located at a distal end of the reed valve module opposite of the seating surface, wherein the housing comprises a first wall portion having an inner surface, and a second wall portion having an inner surface; and
  a reed petal that is positioned adjacent to the sealing face and including an upper portion that is used to secure the reed petal, and a lower portion that is adapted to seal against the sealing face when the reed petal is in a closed position and to deflect away from the sealing face when the reed petal is in an open position,
  wherein the reed valve module is a self-contained modular unit that is adapted to be inserted into a receiving cavity of the modular reed valve assembly;
wherein the seating surface is positioned adjacent to a first retaining surface of the modular reed valve assembly and the interfacing surface is positioned adjacent to a second retaining surface of the modular reed valve assembly,
wherein the reed valve module is pressed, captured, and retained within the modular reed valve assembly between the first and second retaining surfaces,
wherein the inner surface of the first wall portion and the sealing face are configured so that pressing the reed valve module between the first and second retaining surfaces causes the inner surface of the first wall portion to frictionally clamp the upper portion of the reed petal in place against the sealing face, and
wherein the inner surface of the second wall portion is adapted to act as a petal guard to stop the lower portion of the reed petal when the lower portion of the reed petal deflects away from the sealing face.

20. The modular reed valve assembly of claim 19, wherein the structure further comprises a fluid inlet port that is adapted to direct a flow of fluid into the reed valve module, the seating surface of the reed valve module completely surrounding an entire periphery of the fluid inlet port.

21. The modular reed valve assembly of claim 19, wherein the reed valve module is laterally surrounded on all sides by sidewalls of the receiving cavity of the modular reed valve assembly.

22. The modular reed valve assembly of claim 19, wherein the seating surface of the reed valve module is adapted to transfer a differential pressure load across the reed valve module to the first retaining surface of the modular reed valve assembly.

23. The modular reed valve assembly of claim 20, wherein the housing of the reed valve module further comprises a lip that is spaced apart from and positioned between the seating surface and a bottom of the modular housing, the lip comprising the interfacing surface.

24. A mechanical device, comprising:
  a frame comprising at least two fluid chambers; and
  at least one modular reed valve assembly in accordance with claim 19, wherein the at least one modular reed valve assembly is connected to the frame and adapted to control a flow of a fluid between the at least two fluid chambers.

25. The modular reed valve assembly of claim 19, wherein the structure comprises a seat plate, the first retaining surface being located on the seat plate.

26. The modular reed valve assembly of claim 25, wherein the structure comprises a retainer plate, the second retaining surface being located on the retainer plate.

27. The modular reed valve assembly of claim 26, wherein the receiving cavity is at least partially located within the seat plate.

28. The modular reed valve assembly of claim 26, wherein the receiving cavity is at least partially located within the retainer plate.

29. The modular reed valve assembly of claim 26, further comprising a receiving cavity plate that is sandwiched between the seat plate and the retainer plate, wherein the receiving cavity is at least partially located within the receiving cavity plate.

30. A modular reed valve assembly, comprising:
  a structure comprising a receiving cavity;
  a first reed valve module positioned in the receiving cavity, the first reed valve module comprising:
    a module body comprising a first seating surface, and a sealing face;
    a first housing having a first interfacing surface and a bottom that is located at a distal end of the reed valve module opposite of the first seating surface, wherein the first housing comprises a first wall portion having an inner surface, and a second wall portion having an inner surface; and
    a reed petal that is positioned adjacent to the sealing face and including an upper portion that is used to secure the reed petal, and a lower portion that is adapted to seal against the sealing face when the reed petal is in a closed position and to deflect away from the sealing face when the reed petal is in an open position,
    wherein the reed valve module is a self-contained modular unit that is adapted to be inserted into a receiving cavity of the modular reed valve assembly;
  wherein the first seating surface is positioned adjacent to a first retaining surface of the modular reed valve assembly and the first interfacing surface is positioned adjacent to a second retaining surface of the modular reed valve assembly,
  wherein the first reed valve module is pressed, captured, and retained within the modular reed valve assembly between the first and second retaining surfaces,
  wherein the inner surface of the first wall portion and the sealing face are configured so that pressing the reed valve module between the first and second retaining surfaces causes the inner surface of the first wall portion to frictionally clamp the upper portion of the reed petal in place against the sealing face, and
  wherein the inner surface of the second wall portion is adapted to act as a petal guard to stop the lower portion of the reed petal when the lower portion of the reed petal deflects away from the sealing face; and
  a second reed valve module positioned in the receiving cavity, the second reed valve module comprising a second seating surface that is positioned adjacent to a third retaining surface of the modular reed valve assembly and a second interfacing surface that is positioned adjacent to a fourth retaining surface of the modular reed valve assembly,
  wherein the second reed valve module is captured and retained within the modular reed valve assembly between the third and fourth retaining surfaces.

31. The modular reed valve assembly of claim 30, wherein the structure further comprises first and second fluid inlet ports that are adapted to direct a flow of fluid into the respective first and second reed valve modules, the first seating surface of the first reed valve module completely surrounding an entire periphery of the first fluid inlet port and the second seating surface of the second reed valve module completely surrounding an entire periphery of the second fluid inlet port.

32. The modular reed valve assembly of claim 30, wherein the first and second reed valve modules are positioned in the receiving cavity such that a side of the first reed valve module is immediately adjacent to a side of the second reed valve module.

33. The modular reed valve assembly of claim 30, wherein the first and second reed valve modules are laterally surrounded on all sides by sidewalls of the receiving cavity of the modular reed valve assembly.

34. The modular reed valve assembly of claim 30, wherein the first reed valve module is adapted to operate independently of the second reed valve module.

35. The modular reed valve assembly of claim 30, wherein the first and second seating surfaces of the respective first and second reed valve modules are adapted to transfer differential pressure loads across the respective first and second reed valve modules to the respective first and third retaining surfaces of the modular reed valve assembly.

36. A mechanical device, comprising:
a frame comprising at least two fluid chambers; and
at least one modular reed valve assembly in accordance with claim 30, wherein the at least one modular reed valve assembly is connected to the frame and adapted to control a flow of a fluid between the at least two fluid chambers.

37. The modular reed valve assembly of claim 30, wherein the first reed valve module is adapted to be independently inserted in the receiving cavity without first inserting the second reed valve module in the receiving cavity.

38. The modular reed valve assembly of claim 37, wherein the second reed valve module is adapted to be independently inserted in the receiving cavity without first inserting the first reed valve module in the receiving cavity.

39. The modular reed valve assembly of claim 30, wherein the first reed valve module is adapted to be independently removed from the receiving cavity without removing the second reed valve module from the receiving cavity.

40. The modular reed valve assembly of claim 39, wherein the second reed valve module is adapted to be independently removed from the receiving cavity without removing the first reed valve module from the receiving cavity.

41. The modular reed valve assembly of claim 30, wherein the receiving cavity is in fluid communication with respective first and second fluid inlet ports of the modular reed valve assembly that are adapted to direct a flow of fluid into the respective first and second reed valve modules.

42. The modular reed valve assembly of claim 41, wherein the receiving cavity is in fluid communication with at least one outlet port of the modular reed valve assembly that is adapted to direct a flow of fluid exiting the respective first and second reed valve modules out of the modular reed valve assembly.

43. The modular reed valve assembly of claim 41, wherein the first inlet port is axially aligned with a fluid flow inlet and a fluid flow outlet of the first reed valve module and the second inlet port is axially aligned with a fluid flow inlet and a fluid flow outlet of the second reed valve module.

44. The modular reed valve assembly of claim 30, wherein the second reed valve module comprises a second housing, the first and second housings comprising the respective first and second interfacing surfaces.

45. The modular reed valve assembly of claim 44, wherein the structure comprises a seat plate, the first and third retaining surfaces being located on the seat plate.

46. The modular reed valve assembly of claim 45, wherein the structure comprises a retainer plate, the second and fourth retaining surfaces being located on the retainer plate.

47. The modular reed valve assembly of claim 46, wherein the receiving cavity is located within the seat plate.

48. The modular reed valve assembly of claim 46, further comprising a receiving cavity plate that is sandwiched between the seat plate and the retainer plate, wherein the receiving cavity is located within the receiving cavity plate.

49. A method for assembling a modular reed valve assembly, the method comprising:
providing a first structure comprising a receiving cavity and first and second fluid inlet ports, wherein the receiving cavity is in fluid communication with the first and second fluid inlet ports;
providing a first reed valve module comprising:
a module body comprising a first seating surface, and a sealing face;
a housing having a first interfacing surface and a bottom that is located at a distal end of the reed valve module opposite of the first seating surface, wherein the housing comprises a first wall portion having an inner surface, and a second wall portion having an inner surface; and
a reed petal that is positioned adjacent to the sealing face and including an upper portion that is used to secure the reed petal, and a lower portion that is adapted to seal against the sealing face when the reed petal is in a closed position and to deflect away from the sealing face when the reed petal is in an open position,
wherein the reed valve module is a self-contained modular unit that is adapted to be inserted into a receiving cavity of the modular reed valve assembly;
inserting the first reed valve module into the receiving cavity so that the first seating surface of the first reed valve module is positioned adjacent to a first retaining surface of the modular reed valve assembly;
after inserting the first reed valve module into the receiving cavity, inserting a second reed valve module into the receiving cavity so that a second seating surface of the second reed valve module is positioned adjacent to a second retaining surface of the modular reed valve assembly;
attaching a second structure having third and fourth retaining surfaces to the first structure, wherein attaching the second structure to the first structure comprises:
positioning the first interfacing surface of the first reed valve module adjacent to the third retaining surface so that the first reed valve module is captured and retained in the receiving cavity between the first and third retaining surfaces; and
pressing the modular reed valve assembly between the first and second retaining surfaces,
wherein the inner surface of the first wall portion and the sealing face are configured so that pressing the reed valve module between the first and second retaining surfaces causes the inner surface of the first wall portion to frictionally clamp the upper portion of the reed petal in place against the sealing face, and wherein the inner surface of the second wall portion is adapted to act as a petal guard to stop the lower portion of the reed petal when the lower portion of the reed petal deflects away from the sealing face.

50. The method of claim 49, wherein after inserting the first reed valve module into the receiving cavity, the first seating surface of the first reed valve module completely surrounds an entire periphery of the first fluid inlet port, and wherein after inserting the second reed valve module into the receiving cavity the second seating surface of the second reed valve module completely surrounds an entire periphery of the second fluid inlet port.

51. The method of claim 49, wherein after inserting the first and second reed valve modules into the receiving cavity, a side of the first reed valve module is positioned immediately adjacent to a side of the second reed valve module.

52. The method of claim 49, wherein the first and second reed valve modules are adapted to be installed in the modular reed valve assembly independently of each other and are adapted to operate independently of each other.

53. The method of claim 49, wherein the first and second seating surfaces of the respective first and second reed valve modules are adapted to transfer differential pressure loads across the respective first and second reed valve modules to the respective first and second retaining surfaces of the modular reed valve assembly.

54. The method of claim 49, wherein attaching the second structure to the first structure further comprises: positioning a second interfacing surface of the second reed valve module adjacent to the fourth retaining surface so that the second reed valve module is captured and retained in the receiving cavity between the third and fourth retaining surfaces.

55. The method of claim 54, further comprising inserting a third reed valve module into the receiving cavity so that a third seating surface of the third reed valve module is positioned adjacent to a fifth retaining surface of the modular reed valve assembly, wherein after inserting the third reed valve module into the receiving cavity a side of the third reed valve module is immediately adjacent to a side of at least one of the first and second reed valve modules.

56. The method of claim 54, wherein the first structure comprises a seat plate and the first and second retaining surfaces are located on the seat plate.

57. The method of claim 56, wherein the second structure comprises a retainer plate and the third and fourth retaining surfaces are located on the retainer plate.

58. The method of claim 56, wherein the first structure further comprises a receiving cavity plate and the receiving cavity is located within the receiving cavity plate.

* * * * *

UNITED STATES PATENT AND TRADEMARK OFFICE
CERTIFICATE OF CORRECTION

PATENT NO. : 11,002,377 B2  
APPLICATION NO. : 15/974425  
DATED : May 11, 2021  
INVENTOR(S) : Zahroof Mohamed Page 1 of 1

It is certified that error appears in the above-identified patent and that said Letters Patent is hereby corrected as shown below:

In the Claims

Column 24, Line 35 In Claim 14, "The reed valve module of claim 5" should read --The reed valve module of claim 13--.

Column 25, Line 53 In Claim 23, "The modular reed valve assembly of claim 20" should read --The modular reed valve assembly of claim 19--.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*